United States Patent
Shen et al.

(10) Patent No.: US 12,184,450 B2
(45) Date of Patent: Dec. 31, 2024

(54) MAPPING VLAN OF CONTAINER NETWORK TO LOGICAL NETWORK IN HYPERVISOR TO SUPPORT FLEXIBLE IPAM AND ROUTING CONTAINER TRAFFIC

(71) Applicant: VMware LLC, Palo Alto, CA (US)

(72) Inventors: Jianjun Shen, Redwood City, CA (US); Ran Gu, Beijing (CN); Caixia Jiang, Beijing (CN); Yves Fauser, Munich (DE)

(73) Assignee: VMware LLC, Palo Alto, CA (US)

( * ) Notice: Subject to any disclaimer, the term of this patent is extended or adjusted under 35 U.S.C. 154(b) by 104 days.

(21) Appl. No.: 17/724,433

(22) Filed: Apr. 19, 2022

(65) Prior Publication Data

US 2023/0300002 A1 Sep. 21, 2023

(30) Foreign Application Priority Data

Mar. 18, 2022 (WO) ................ PCT/CN2022/081683

(51) Int. Cl.
*H04L 12/46* (2006.01)
*G06F 9/455* (2018.01)
(Continued)

(52) U.S. Cl.
CPC ...... *H04L 12/4645* (2013.01); *G06F 9/45558* (2013.01); *G06F 9/5016* (2013.01);
(Continued)

(58) Field of Classification Search
CPC ............. H04L 12/4645; H04L 41/0803; H04L 41/122; G06F 9/547
See application file for complete search history.

(56) References Cited

U.S. PATENT DOCUMENTS 6,697,360 B1 2/2004 Gai et al.
6,765,914 B1 * 7/2004 Jain .................. H04L 45/583
370/395.31
(Continued)

FOREIGN PATENT DOCUMENTS

AU 2004227600 B2 5/2009
CA 3107455 A1 2/2020
(Continued)

OTHER PUBLICATIONS

Abhashkumar, Anubhavnidhi, et al., "Supporting Diverse Dynamic Intent-based Policies Using Janus," CoNEXT 17, Dec. 12-15, 2017, 14 pages, ACM, Incheon, KR.
(Continued)

*Primary Examiner* — Fadi Haj Said
(74) *Attorney, Agent, or Firm* — Quarles & Brady LLP

(57) ABSTRACT

Some embodiments of the invention provide a method for adding routable subnets to a logical network that connects multiple machines and is implemented by a software defined network (SDN). The method receives an intent-based API that includes a request to add a routable subnet to the logical network. The method defines (i) a VLAN (virtual local area network) tag associated with the routable subnet, (ii) a first identifier associated with a first logical switch to which at least a first machine in the multiple machines that executes a set of containers belonging to the routable subnet attaches, and (iii) a second identifier associated with a second logical switch designated for the routable subnet. The method generates an API call that maps the VLAN tag and the first identifier to the second identifier. The method provides the API call to a management and control cluster of the SDN.

20 Claims, 12 Drawing Sheets

(51) Int. Cl.
  *G06F 9/50* (2006.01)
  *G06F 9/54* (2006.01)
  *H04L 41/0803* (2022.01)
  *H04L 41/122* (2022.01)
  *H04L 61/2521* (2022.01)

(52) U.S. Cl.
  CPC .............. *G06F 9/505* (2013.01); *G06F 9/547* (2013.01); *H04L 41/0803* (2013.01); *H04L 41/122* (2022.05); *H04L 61/2535* (2013.01); *G06F 2009/4557* (2013.01); *G06F 2009/45595* (2013.01)

(56) References Cited

U.S. PATENT DOCUMENTS

| | | |
|---|---|---|
| 7,869,439 B1 | 1/2011 | Ramberg et al. |
| 7,890,543 B2 | 2/2011 | Hunt et al. |
| 7,912,955 B1 | 3/2011 | Machiraju et al. |
| 8,627,442 B2 | 1/2014 | Ji et al. |
| 8,683,560 B1 | 3/2014 | Brooker et al. |
| 9,152,803 B2 | 10/2015 | Biswas et al. |
| 9,225,638 B2 | 12/2015 | Jain et al. |
| 9,258,312 B1 | 2/2016 | O'Neill et al. |
| 9,531,590 B2 | 12/2016 | Jain et al. |
| 9,536,077 B2 | 1/2017 | Bignon et al. |
| 9,590,901 B2 | 3/2017 | Tubaltsev et al. |
| 9,594,546 B1 | 3/2017 | Todd et al. |
| 9,674,275 B1 | 6/2017 | Engers et al. |
| 9,755,898 B2 | 9/2017 | Jain et al. |
| 9,774,537 B2 | 9/2017 | Jain et al. |
| 9,813,509 B1 | 11/2017 | Visser et al. |
| 9,825,810 B2 | 11/2017 | Jain et al. |
| 9,935,827 B2 | 4/2018 | Jain et al. |
| 9,979,641 B2 | 5/2018 | Jain et al. |
| 10,095,669 B1 | 10/2018 | Karppanen |
| 10,122,735 B1 | 11/2018 | Wohlgemuth |
| 10,129,077 B2 | 11/2018 | Jain et al. |
| 10,135,737 B2 | 11/2018 | Jain et al. |
| 10,193,977 B2 | 1/2019 | Ke et al. |
| 10,205,701 B1 * | 2/2019 | Voss ........................ H04L 67/02 |
| 10,225,137 B2 | 3/2019 | Jain et al. |
| 10,257,095 B2 | 4/2019 | Jain et al. |
| 10,270,796 B1 | 4/2019 | Veeraswamy et al. |
| 10,320,679 B2 | 6/2019 | Jain et al. |
| 10,341,233 B2 | 7/2019 | Jain et al. |
| 10,496,605 B2 | 12/2019 | Melnik et al. |
| 10,516,568 B2 | 12/2019 | Jain et al. |
| 10,547,521 B1 | 1/2020 | Roy et al. |
| 10,594,743 B2 | 3/2020 | Hong et al. |
| 10,609,091 B2 | 3/2020 | Hong et al. |
| 10,613,888 B1 | 4/2020 | Mentz et al. |
| 10,628,144 B2 | 4/2020 | Myneni et al. |
| 10,652,143 B2 | 5/2020 | Ravinoothala et al. |
| 10,693,782 B2 | 6/2020 | Jain et al. |
| 10,708,368 B1 | 7/2020 | Young et al. |
| 10,725,836 B2 | 7/2020 | Savenkov et al. |
| 10,795,909 B1 | 10/2020 | Bond et al. |
| 10,812,337 B2 | 10/2020 | Vaidya et al. |
| 10,841,226 B2 | 11/2020 | Mariappan et al. |
| 10,860,444 B2 | 12/2020 | Natanzon |
| 10,942,788 B2 | 3/2021 | Palavalli et al. |
| 10,944,691 B1 | 3/2021 | Raut et al. |
| 10,951,661 B1 | 3/2021 | Medan et al. |
| 10,972,341 B2 | 4/2021 | Mudigonda |
| 10,972,386 B2 | 4/2021 | Mackie et al. |
| 11,074,091 B1 | 7/2021 | Nayakbomman et al. |
| 11,086,700 B2 | 8/2021 | Myneni et al. |
| 11,159,366 B1 | 10/2021 | Gawade et al. |
| 11,190,491 B1 | 11/2021 | Kaciulis et al. |
| 11,194,483 B1 | 12/2021 | Dontu et al. |
| 11,277,309 B2 | 3/2022 | Vaidya et al. |
| 11,316,822 B1 | 4/2022 | Gawade et al. |
| 11,436,057 B2 | 9/2022 | Shen et al. |
| 11,500,688 B2 | 11/2022 | Liu et al. |
| 11,570,146 B2 | 1/2023 | Liu et al. |
| 11,606,254 B2 | 3/2023 | Liu et al. |
| 11,671,400 B2 | 6/2023 | Zhou et al. |
| 11,671,401 B2 | 6/2023 | Singh et al. |
| 11,689,425 B2 | 6/2023 | Vaidya et al. |
| 11,689,497 B2 | 6/2023 | Shen et al. |
| 11,748,170 B2 | 9/2023 | Palavalli et al. |
| 2004/0098154 A1 | 5/2004 | McCarthy |
| 2005/0129019 A1 | 6/2005 | Cheriton |
| 2007/0244962 A1 | 10/2007 | Laadan et al. |
| 2007/0245334 A1 | 10/2007 | Nieh et al. |
| 2010/0149996 A1 | 6/2010 | Sun |
| 2010/0177674 A1 | 7/2010 | Aggarwal |
| 2010/0211815 A1 | 8/2010 | Mankovskii et al. |
| 2010/0246545 A1 | 9/2010 | Berzin |
| 2010/0293378 A1 | 11/2010 | Xiao et al. |
| 2011/0161988 A1 | 6/2011 | Kashyap |
| 2011/0194494 A1 | 8/2011 | Aso et al. |
| 2011/0282936 A1 | 11/2011 | Chekhanovskiy et al. |
| 2011/0289508 A1 | 11/2011 | Fell et al. |
| 2012/0117226 A1 | 5/2012 | Tanaka et al. |
| 2012/0150912 A1 | 6/2012 | Ripberger |
| 2012/0304275 A1 | 11/2012 | Ji et al. |
| 2013/0018994 A1 | 1/2013 | Flavel et al. |
| 2013/0019314 A1 | 1/2013 | Ji et al. |
| 2013/0125230 A1 | 5/2013 | Koponen et al. |
| 2013/0174168 A1 | 7/2013 | Abuelsaad et al. |
| 2013/0266019 A1 | 10/2013 | Qu et al. |
| 2013/0283339 A1 | 10/2013 | Biswas et al. |
| 2014/0036730 A1 | 2/2014 | Nellikar et al. |
| 2014/0056298 A1 * | 2/2014 | Vobbilisetty ............ H04L 12/46 370/355 |
| 2014/0129690 A1 | 5/2014 | Jaisinghani et al. |
| 2014/0164897 A1 | 6/2014 | Yucel et al. |
| 2014/0223556 A1 | 8/2014 | Bignon et al. |
| 2014/0237100 A1 | 8/2014 | Cohn et al. |
| 2014/0258479 A1 | 9/2014 | Tenginakai et al. |
| 2015/0063166 A1 | 3/2015 | Sif et al. |
| 2015/0081767 A1 | 3/2015 | Evens |
| 2015/0100704 A1 | 4/2015 | Davie et al. |
| 2015/0172093 A1 | 6/2015 | Kaneko et al. |
| 2015/0222598 A1 | 8/2015 | Koponen et al. |
| 2015/0249574 A1 | 9/2015 | Zhang |
| 2015/0263899 A1 | 9/2015 | Tubaltsev et al. |
| 2015/0263946 A1 | 9/2015 | Tubaltsev et al. |
| 2015/0317169 A1 | 11/2015 | Sinha et al. |
| 2015/0348044 A1 | 12/2015 | Smith |
| 2015/0379281 A1 | 12/2015 | Feroz et al. |
| 2016/0036860 A1 | 2/2016 | Xing et al. |
| 2016/0080422 A1 | 3/2016 | Belgodere et al. |
| 2016/0094454 A1 | 3/2016 | Jain et al. |
| 2016/0094457 A1 | 3/2016 | Jain et al. |
| 2016/0094650 A1 | 3/2016 | Rio |
| 2016/0094661 A1 | 3/2016 | Jain et al. |
| 2016/0182293 A1 | 6/2016 | Benedetto et al. |
| 2016/0217301 A1 | 7/2016 | Watanabe et al. |
| 2016/0239326 A1 | 8/2016 | Kaplan et al. |
| 2016/0241436 A1 | 8/2016 | Fourie et al. |
| 2016/0254964 A1 | 9/2016 | Benc |
| 2016/0269318 A1 | 9/2016 | Su et al. |
| 2016/0294612 A1 | 10/2016 | Ravinoothala et al. |
| 2016/0315809 A1 | 10/2016 | McMurry et al. |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |
| 2017/0063782 A1 | 3/2017 | Jain et al. |
| 2017/0085561 A1 | 3/2017 | Han et al. |
| 2017/0093790 A1 | 3/2017 | Banerjee et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |
| 2017/0286698 A1 | 10/2017 | Shetty et al. |
| 2017/0317954 A1 | 11/2017 | Masurekar et al. |
| 2017/0324781 A1 | 11/2017 | Hu et al. |

(56) References Cited

U.S. PATENT DOCUMENTS

| | | |
|---|---|---|
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0019969 A1 | 1/2018 | Murthy |
| 2018/0063194 A1 | 3/2018 | Vaidya et al. |
| 2018/0083835 A1 | 3/2018 | Cole et al. |
| 2018/0089299 A1 | 3/2018 | Collins et al. |
| 2018/0114012 A1 | 4/2018 | Sood et al. |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167458 A1 | 6/2018 | Ould-Brahim et al. |
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0234459 A1 | 8/2018 | Kung et al. |
| 2018/0248827 A1 | 8/2018 | Scharber et al. |
| 2018/0262424 A1 | 9/2018 | Roeland et al. |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0034237 A1 | 1/2019 | Siddappa et al. |
| 2019/0036868 A1 | 1/2019 | Chandrashekhar et al. |
| 2019/0042518 A1 | 2/2019 | Marolia et al. |
| 2019/0068500 A1 | 2/2019 | Hira |
| 2019/0068544 A1 | 2/2019 | Hao et al. |
| 2019/0079751 A1 | 3/2019 | Foskett et al. |
| 2019/0097879 A1 | 3/2019 | Cai et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1 | 6/2019 | Hira et al. |
| 2019/0229987 A1 | 7/2019 | Shelke et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0245757 A1 | 8/2019 | Meyer et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0084112 A1 | 3/2020 | Kandaswamy et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0301801 A1 | 9/2020 | Hegde |
| 2020/0314006 A1 | 10/2020 | Mackie et al. |
| 2020/0314173 A1 | 10/2020 | Pahwa et al. |
| 2020/0344120 A1 | 10/2020 | Pianigiani et al. |
| 2020/0366558 A1 | 11/2020 | Vaidya et al. |
| 2020/0374186 A1 | 11/2020 | Scott |
| 2020/0379812 A1 | 12/2020 | Ranjan et al. |
| 2020/0382556 A1 | 12/2020 | Woolward et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1 | 3/2021 | Alluboyina et al. |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0218652 A1 | 7/2021 | Raut et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1 | 10/2021 | Zhou et al. |
| 2021/0328858 A1 | 10/2021 | Asveren et al. |
| 2021/0349765 A1 | 11/2021 | Zhou et al. |
| 2021/0352044 A1 | 11/2021 | Asveren et al. |
| 2021/0365308 A1 | 11/2021 | Myneni et al. |
| 2021/0397466 A1 | 12/2021 | McKee et al. |
| 2021/0409336 A1 | 12/2021 | Talur et al. |
| 2022/0012045 A1 | 1/2022 | Rudraraju et al. |
| 2022/0035651 A1 | 2/2022 | Maurya et al. |
| 2022/0038311 A1 | 2/2022 | Shen et al. |
| 2022/0070250 A1 | 3/2022 | Baid et al. |
| 2022/0091868 A1 | 3/2022 | Malleni et al. |
| 2022/0158926 A1 | 5/2022 | Wennerstrom et al. |
| 2022/0182439 A1 | 6/2022 | Zhou et al. |
| 2022/0200865 A1 | 6/2022 | Vaidya et al. |
| 2022/0210113 A1 | 6/2022 | Pillareddy et al. |
| 2022/0278926 A1 | 9/2022 | Sharma et al. |
| 2022/0303246 A1 | 9/2022 | Miriyala et al. |
| 2022/0311738 A1 | 9/2022 | Singh et al. |
| 2022/0321495 A1 | 10/2022 | Liu et al. |
| 2022/0400053 A1 | 12/2022 | Liu et al. |
| 2023/0043362 A1 | 2/2023 | Kita et al. |
| 2023/0070224 A1 | 3/2023 | Huo et al. |
| 2023/0104568 A1 | 4/2023 | Miriyala et al. |
| 2023/0179484 A1 | 6/2023 | Liu et al. |
| 2023/0179573 A1 | 6/2023 | Sosnovich et al. |
| 2023/0231741 A1 | 7/2023 | Tang et al. |
| 2023/0231827 A1 | 7/2023 | Tang et al. |
| 2023/0244591 A1 | 8/2023 | Sun et al. |

FOREIGN PATENT DOCUMENTS

| | | |
|---|---|---|
| CN | 105897946 A | 8/2016 |
| CN | 106789367 A | 5/2017 |
| CN | 107947961 A | 4/2018 |
| CN | 108809722 A | 11/2018 |
| CN | 110531987 A | 12/2019 |
| CN | 110611588 A | 12/2019 |
| CN | 111327640 A | 6/2020 |
| CN | 111371627 A | 7/2020 |
| CN | 111865643 A | 10/2020 |
| EP | 2464151 A2 | 6/2012 |
| EP | 2464152 A2 | 6/2012 |
| EP | 2830270 A1 | 1/2015 |
| EP | 3316532 A1 | 5/2018 |
| EP | 3617879 A1 | 3/2020 |
| IN | 113141386 A | 7/2021 |
| JP | 2011070707 A | 4/2011 |
| JP | 2012099048 A | 5/2012 |
| JP | 2014535213 A | 12/2014 |
| JP | 2015115043 A | 6/2015 |
| JP | 2018523932 A | 8/2018 |
| WO | 2011159842 A2 | 12/2011 |
| WO | 2013063330 A1 | 5/2013 |
| WO | 2016160523 A1 | 10/2016 |
| WO | 2018044341 A1 | 3/2018 |
| WO | 2018044352 A1 | 3/2018 |
| WO | 2019241086 A1 | 12/2019 |
| WO | 2020041073 A1 | 2/2020 |
| WO | 2020041074 A1 | 2/2020 |

(56) References Cited

FOREIGN PATENT DOCUMENTS

| WO | 2021196080 A1 | 10/2021 |
|---|---|---|
| WO | 2022026028 A1 | 2/2022 |
| WO | 2022204941 A9 | 10/2022 |
| WO | 2023133797 A1 | 7/2023 |

OTHER PUBLICATIONS

Abwnawar, Nasser, "A Policy-Based Management Approach to Security in Cloud Systems," Feb. 2020, 184 pages, De Monfort University, Leicester, UK.
Author Unknown, "E-Security Begins with Sound Security Policies," Jun. 14, 2001, 23 pages, Symantec Corporation.
Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.
Author Unknown, "OpenShift Container Platform 4.6," Mar. 3, 2021, 41 pages, Red Hat, Inc.
Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.
Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.
Non-published Commonly Owned U.S. Appl. No. 17/333,136, filed May 28, 2021, 32 pages, VMware, Inc.
Non-published Commonly Owned U.S. Appl. No. 17/389,305, filed Jul. 29, 2021, 32 pages, VMware, Inc.
Non-published Commonly Owned U.S. Appl. No. 17/684,160, filed Mar. 1, 2022, 40 pages, VMware, Inc.
Non-published Commonly Owned U.S. Appl. No. 17/684,169, filed Mar. 1, 2022, 41 pages, VMware, Inc.
Non-published Commonly Owned U.S. Appl. No. 17/696,366, filed Mar. 16, 2022, 27 pages, VMware, Inc.
Non-published Commonly Owned Related U.S. Appl. No. 17/724,436 with similar specification, filed Apr. 19, 2022, 51 pages, VMware, Inc.
Rouse, Margaret, "What is SDDC (software-defined data center)?—Definition from WhatIs.com," Mar. 2017, 5 pages, TechTarget.com.
Sayfan, Gigi, "Mastering Kubernetes: Automating container deployment and management," May 2017, 426 pages, Packt Publishing, Birmingham, UK.
Wodicka, Brent, "A Developer's Guide to Container Orchestration, Kubernetes, & AKS," Mar. 19, 2019, 5 pages, AIS, Reston, VA, USA.
Non-Published Commonly Owned U.S. Appl. No. 18/211,360, filed Jun. 19, 2023, 41 pages, VMware, Inc.
Author Unknown, "NSX vSphere API Guide—NSX 6.2 for vSphere," Jan. 6, 2017, 400 pages, VMware, Inc.
Non-Published Commonly Owned U.S. Appl. No. 18/102,700, filed Jan. 28, 2023, 39 pages, VMware, Inc.
Author Unknown, "Advanced Networking Features in Kubernetes and Container Bare Metal," Document 606835-001, Dec. 2018, 42 pages, Intel Corporation.
Author Unknown, "Chapter 4: Default Security Policy," IBM Security Access Manager Version 9.0, Oct. 2015, 18 pages.
Author Unknown, "Containers and Container Networking for Network Engineers: VMware NSX Container Networking," Jan. 2018, 58 pages, VMware, Inc.
Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.
PCT International Search Report and Written Opinion of Commonly Owned International Patent Application PCT/CN2022/081683, mailing date Sep. 13, 2022, 14 pages, International Searching Authority (EPO).
Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.
Author Unknown, "Assign Memory Resources to Containers and Pods," Oct. 17, 2020, 7 pages.
Author Unknown, "Nsx and Micro-segmentation," Jan. 3, 2017, 2 pages, retrieved from https://www.youtube.com/watch?v=1_QtISXaxkE.
Author Unknown, "NSX Policy API: Getting Started Guide," Technical White Paper, Sep. 2019, 28 pages, VMware, Inc.
Author Unknown, "VMware NSX for vSphere 6.4—Application Rule Manager Enhancements," Jan. 20, 2018, 2 pages, retrieved from https://www.youtube.com/watch?v=r3IKNkt5mi8.
Author Unknown, "VMware NSX-T 2.4: Advancing NSX Everywhere for Everyone," Feb. 27, 2019, 2 pages, retrieved from https://www.youtube.com/watch?v=lqPyRBWABHg.
Non-Published Commonly Owned U.S. Appl. No. 18/227,306, filed Jul. 28, 2023, 37 pages, VMware, Inc.
Patni, Sanjay, "Pro RESTful APIs," Month Unknown 2017, 136 pages, Apress, New York City, NY, USA.

\* cited by examiner

MAPPING VLAN OF CONTAINER NETWORK TO LOGICAL NETWORK IN HYPERVISOR TO SUPPORT FLEXIBLE IPAM AND ROUTING CONTAINER TRAFFIC

BACKGROUND

Container networks (e.g., Kubernetes) are an increasingly popular type of network system for deploying applications in datacenters. The sets of containers of containers produced by such a system can be deployed more rapidly than virtual machines (VMs) or physical computers. Therefore, a deployment can be scaled up or down to meet demand more rapidly than is typical for VMs or physical computers. In addition, a set of containers in a container network system has less overhead and can generally perform the same tasks faster than a corresponding VM would.

In some present container-based network systems (e.g., Kubernetes), sets of containers are instantiated within nodes. Each node in the present system has a single subnet. Any pod or container executed within a particular node is limited to IP addresses within that subnet. This means that when a pod or container in the present system moves to another node, it can no longer keep the same IP address. Additionally, this means that containers and sets of containers on different nodes must be on different subnets, even if they have closely related functions, are owned by the same client, are part of the same namespace (group of resources within a single cluster), etc. Accordingly, there is a need in the art for a method for supporting flexible IP allocation for containers such that an underlay network can forward container traffic.

BRIEF SUMMARY

Some embodiments of the invention provide a method of adding routable segments to a logical network that connects a plurality of machines and is implemented by a software defined network (SDN). In some embodiments, the method is performed by a control system for the logical network. The method receives an intent-based API that includes a request to add a routable subnet to the logical network. The intent-based API is received, in some embodiments, through a user interface (UI) provided by the control system. The method defines (1) a VLAN (virtual local area network) tag associated with the routable subnet, (2) a first identifier associated with a first logical switch to which at least a first machine in the plurality of machines that executes a set of containers belonging to the routable subnet attaches, and (3) a second identifier associated with a second logical switch designated for the routable subnet. The method generates an API call that maps the VLAN tag and the first identifier to the second identifier, and provides the API call to a management and control cluster of the SDN to direct the management and control cluster to implement the routable subnet (e.g., by communicating with local controllers operating on network elements to configure the network elements to implement the routable segment according to the API call).

In some embodiments, the first and second identifiers are first and second logical switch identifiers, and the API call maps the VLAN identifier and the first logical switch identifier to the second logical switch identifier. In other embodiments, the first identifier is a logical switch identifier and the second identifier is a virtual private cloud (VPC) identifier, and the API call maps the VLAN identifier and the logical switch identifier to the VPC identifier. In still other embodiments, the first identifier is a VNIC (virtual network interface card) identifier (e.g., a VNIC identifier associated with a VNIC of the machine) and the second identifier is a virtual private cloud (VPC) identifier, and the API call maps the VLAN identifier and the VNIC identifier to the VPC identifier. In still even other embodiments, the first identifier is a logical switch port identifier associated with the first logical switch and the second identifier is a virtual private cloud (VPC) identifier, and the API call maps the VLAN identifier and the logical switch port identifier to the VPC identifier. The VPC identifiers, in some embodiments, are logical network identifiers (LNIs).

In some embodiments, the intent-based API is a first intent-based API, the routable subnet is a first routable subnet of the logical network, the VLAN tag is a first VLAN tag, the set of containers is a first set of containers, and the API call is a first API call. In some such embodiments, the control system can receive a second intent-based API that includes a request to add a second routable subnet to the logical network. In response to receiving the second intent-based API, the control system of some embodiments defines (1) a second VLAN tag associated with the second routable subnet, (2) a third identifier associated with a third logical switch to which at least a second machine of the logical network that executes a second set of containers belonging to the second routable subnet attaches, and (3) a fourth identifier associated with a fourth logical switch designated for the second routable subnet. The control system generates a second API call that maps the second VLAN tag and the third identifier to the fourth identifier, and provides the second API call to the management and control cluster of the SDN to direct the management and control cluster to implement the second routable segment, according to some embodiments.

The routable subnet, in some embodiments, enables multiple containers belonging to the routable subnet to be deployed across the multiple machines connected by the logical network. As such, in some embodiments, a third set of containers belonging to the second routable subnet can execute on the first machine separately from the first set of containers. In some such embodiments, the control system generates a third API call that maps the second VLAN tag and the first identifier to the third identifier, and provides this third API call to the management and control cluster of the SDN to direct the management and control cluster to update an implementation of the second routable segment (i.e., to configure the additional mapping).

In some embodiments, to enable the second and third logical switches to transport data messages to and from the first, second, and third sets of containers, the first set of containers are logically attached to the second logical switch designated for the first routable subnet and the second and third sets of containers are logically attached to the fourth logical switch designated for the second routable subnet. The second logical switch then transports traffic tagged with the first VLAN tag to and from the first set of containers, while the fourth logical switch transports traffic tagged with the second VLAN tag to and from the second and third sets of containers, according to some embodiments.

Some embodiments of the invention also provide a method for processing data messages for the routable subnets. For instance, in some embodiments, when a gateway logical router (e.g., a tier-0 gateway logical router that logically connects a logical network to external networks) receives an inbound data message, the gateway logical router performs a DNAT (destination network address translation) operation on the received data message to identify a record associated with a destination IP (Internet protocol)

address of the data message. From the record, the gateway logical router identifies a VLAN identifier, an LNI, and a destination host computer IP address for the data message, and encapsulates the data message with an outer header containing the destination host computer IP address and the VLAN identifier. The gateway logical router then forwards the encapsulated data message to the destination host computer.

In some embodiments, the data message is destined to one of multiple sets of containers in the logical network, and each set of containers is assigned an IP address from an IP address pool allocated to the subnet to which the set of containers belongs. Each set of containers, in some embodiments, uses (address resolution protocol) ARP messages (i.e., for IPv4) or (neighbor discovery) ND messages (i.e., for IPv6) tagged with the VLAN identifier to advertise the assigned IP addresses to each other set of containers belonging to the subnet. By tagging the ARP and/or ND messages with the VLAN identifier, some embodiments ensure that the ARP and/or ND messages are only read by other members of the subnet.

In addition to inbound data messages, the gateway logical router also processes outbound data messages. For instance, upon receiving an encapsulated data message with outer and inner headers storing an LNI, a logical source IP address, and a VLAN identifier, the gateway logical router of some embodiments uses the VLAN identifier to identify a subnet to which a source of the data message belongs. Based on the identified subnet, the gateway logical router performs a SNAT (source network address translation) operation to identify an external source IP address for the data message, and forwards the data message with a header containing the identified external source IP address. In some embodiments, before forwarding the data message, the gateway logical router creates a NAT (network address translation) record identifying the VLAN identifier and logical source IP address, and subsequently uses the NAT record to process inbound data messages destined to the external source IP address. The external source IP address is identified from a SNAT IP address pool allocated to the identified subnet, according to some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
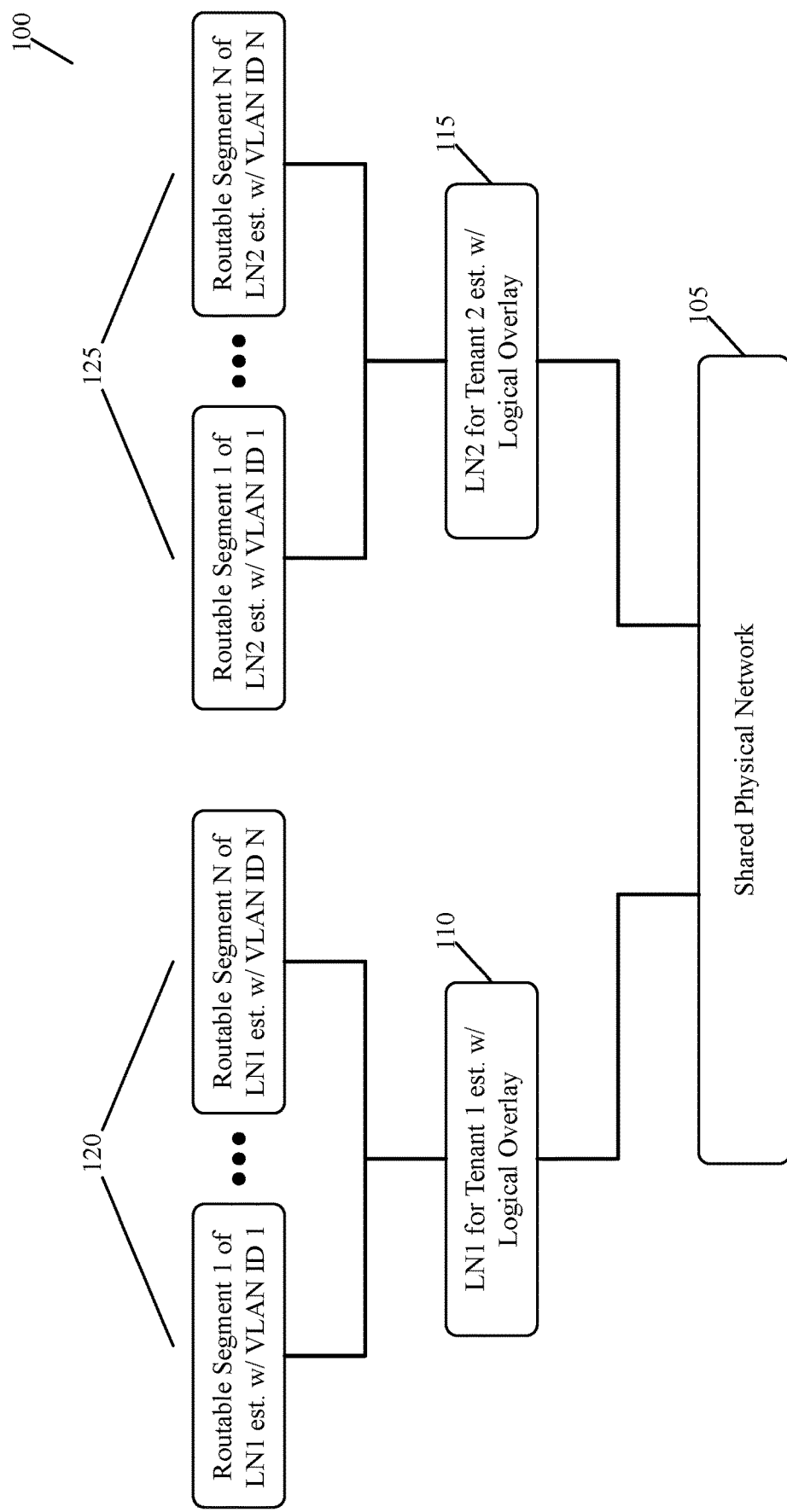
FIG. 1 conceptually illustrates a diagram of a logical overlay environment in which multiple logical networks on the same physical network each include multiple routable segments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of adding routable segments to a logical network that connects a plurality of machines and is implemented by a software defined network (SDN). In some embodiments, the method is performed by a control system for the logical network. The method receives an intent-based API that includes a request to add a routable subnet to the logical network. The intent-based API is received, in some embodiments, through a user interface (UI) provided by the control system. The method defines (1) a VLAN (virtual local area network) tag associated with the routable subnet, (2) a first identifier associated with a first logical switch to which at least a first machine in the plurality of machines that executes a set of containers belonging to the routable subnet attaches, and (3) a second identifier associated with a second logical switch designated for the routable subnet. The method generates an API call that maps the VLAN tag and the first identifier to the second identifier, and provides the API call to a management and control cluster of the SDN to direct the management and control cluster to implement the routable subnet (e.g., by communicating with local controllers operating on network elements to configure the network elements to implement the routable segment according to the API call).

In some embodiments, the first and second identifiers are first and second logical switch identifiers, and the API call maps the VLAN identifier and the first logical switch identifier to the second logical switch identifier. In other embodiments, the first identifier is a logical switch identifier and the second identifier is a virtual private cloud (VPC) identifier, and the API call maps the VLAN identifier and the logical switch identifier to the VPC identifier. In still other embodiments, the first identifier is a VNIC (virtual network interface card) identifier (e.g., a VNIC identifier associated with a VNIC of the machine) and the second identifier is a virtual private cloud (VPC) identifier, and the API call maps the VLAN identifier and the VNIC identifier to the VPC identifier. In still even other embodiments, the first identifier is a logical switch port identifier associated with the first logical switch and the second identifier is a virtual private cloud (VPC) identifier, and the API call maps the VLAN identifier and the logical switch port identifier to the VPC identifier. The VPC identifiers, in some embodiments, are logical network identifiers (LNIs).

In some embodiments, the intent-based API is a first intent-based API, the routable subnet is a first routable subnet of the logical network, the VLAN tag is a first VLAN tag, the set of containers is a first set of containers, and the API call is a first API call. In some such embodiments, the control system can receive a second intent-based API that includes a request to add a second routable subnet to the logical network. In response to receiving the second intent-based API, the control system of some embodiments defines (1) a second VLAN tag associated with the second routable subnet, (2) a third identifier associated with a third logical switch to which at least a second machine of the logical network that executes a second set of containers belonging to the second routable subnet attaches, and (3) a fourth identifier associated with a fourth logical switch designated for the second routable subnet. The control system generates a second API call that maps the second VLAN tag and the third identifier to the fourth identifier, and provides the second API call to the management and control cluster of the SDN to direct the management and control cluster to implement the second routable segment, according to some embodiments.

The routable subnet, in some embodiments, enables multiple containers belonging to the routable subnet to be deployed across the multiple machines connected by the logical network. As such, in some embodiments, a third set of containers belonging to the second routable subnet can execute on the first machine separately from the first set of containers. In some such embodiments, the control system generates a third API call that maps the second VLAN tag and the first identifier to the third identifier, and provides this third API call to the management and control cluster of the SDN to direct the management and control cluster to update an implementation of the second routable segment (i.e., to configure the additional mapping).

In some embodiments, to enable the second and third logical switches to transport data messages to and from the first, second, and third sets of containers, the first set of containers are logically attached to the second logical switch designated for the first routable subnet and the second and third sets of containers are logically attached to the fourth logical switch designated for the second routable subnet. The second logical switch then transports traffic tagged with the first VLAN tag to and from the first set of containers, while the fourth logical switch transports traffic tagged with the second VLAN tag to and from the second and third sets of containers, according to some embodiments.

Some embodiments of the invention also provide a method for processing data messages for the routable subnets. For instance, in some embodiments, when a gateway logical router (e.g., a tier-0 gateway logical router that logically connects a logical network to external networks) receives an inbound data message, the gateway logical router performs a DNAT (destination network address translation) operation on the received data message to identify a record associated with a destination IP (Internet protocol) address of the data message. From the record, the gateway logical router identifies a VLAN identifier, an LNI, and a destination host computer IP address for the data message, and encapsulates the data message with an outer header containing the destination host computer IP address and the VLAN identifier. The gateway logical router then forwards the encapsulated data message to the destination host computer.

In some embodiments, the data message is destined to one of multiple sets of containers in the logical network, and each set of containers is assigned an IP address from an IP address pool allocated to the subnet to which the set of containers belongs. Each set of containers, in some embodiments, uses (address resolution protocol) ARP messages (i.e., for IPv4) or (neighbor discovery) ND messages (i.e., for IPv6) tagged with the VLAN identifier to advertise the assigned IP addresses to each other set of containers belonging to the subnet. By tagging the ARP and/or ND messages with the VLAN identifier, some embodiments ensure that the ARP and/or ND messages are only read by other members of the subnet.

In addition to inbound data messages, the gateway logical router also processes outbound data messages. For instance, upon receiving an encapsulated data message with outer and inner headers storing an LNI, a logical source IP address, and a VLAN identifier, the gateway logical router of some embodiments uses the VLAN identifier to identify a subnet to which a source of the data message belongs. Based on the identified subnet, the gateway logical router performs a SNAT (source network address translation) operation to identify an external source IP address for the data message, and forwards the data message with a header containing the identified external source IP address. In some embodiments, before forwarding the data message, the gateway logical router creates a NAT (network address translation) record identifying the VLAN identifier and logical source IP address, and subsequently uses the NAT record to process inbound data messages destined to the external source IP address. The external source IP address is identified from a SNAT IP address pool allocated to the identified subnet, according to some embodiments.

FIG. 1 conceptually illustrates a diagram 100 of a logical overlay environment in which multiple logical networks on the same physical network each include multiple routable segments. As shown, a first logical network 110 for a first tenant and a second logical network 115 for a second tenant are each established with logical overlays on top of a shared physical network 105. In some embodiments, when a logical overlay is established, data messages are encapsulated with an outer header for traversing the underlay network (e.g., shared physical network 105) and an inner header containing network addresses associated with the overlay logical network.

To enable multiple subnets to be created within each tenant logical network, some embodiments use VLAN identifiers to define different segregated segments (i.e., layer 2 (L2) networks) of a logical network (or logical switch) and associate these different segments with different subnets (e.g., container subnets) corresponding to the VLAN identifiers. For instance, the first logical network 110 for the first tenant includes multiple routable segments 1-N 120 established with respective VLAN identifiers 1-N, and the second logical network 115 for the second tenant includes multiple routable segments 1-N 125 established with respective VLAN identifiers 1-N. Each of the routable segments 120 and 125 corresponds to a separate subnet of one of the tenant logical networks 110 and 115.

As a result of using the VLAN identifiers to define different segregated segments 120 and 125 and to associate these segments with subnets corresponding to the VLAN identifiers, workloads (e.g., container sets, pods, etc.) belonging to different subnets can run on the same host, and workloads belonging to the same subnet can run on different hosts, according to some embodiments. When the shared physical network 105 is a traditional physical network, the subnets should already be configured on the physical network with the correct VLANs so that the physical network can forward traffic in the VLANs, according to some embodiments, whereas when the shared physical network 105 is implemented by a SDN, an orchestration component (i.e., a component of a management and control system for a container network) automatically programs the SDN to map a VLAN identifier and a container host network to a logical network with the corresponding subnet. For datacenter implementations, such as VMware, Inc.'s NSX-T™ Data Center, some embodiments add an API to map a VLAN identifier and a segment connected to a host machine that hosts one or more container sets or pods belonging to the subnet corresponding to the VLAN identifier to a routable segment (e.g., 120 or 125) associated with the VLAN identifier.

In other embodiments, different LNIs are not used for different tenants. For instance, some embodiments have virtual private clouds (VPCs) with VPC identifiers. Some embodiments also use VLANs to define routable segments in an SDDC (software-defined datacenter) that uses SDN managers and controllers to define a logical overlay network as a means for managing and controlling shared physical network infrastructure (e.g., shared by different tenants).

Figure 2:
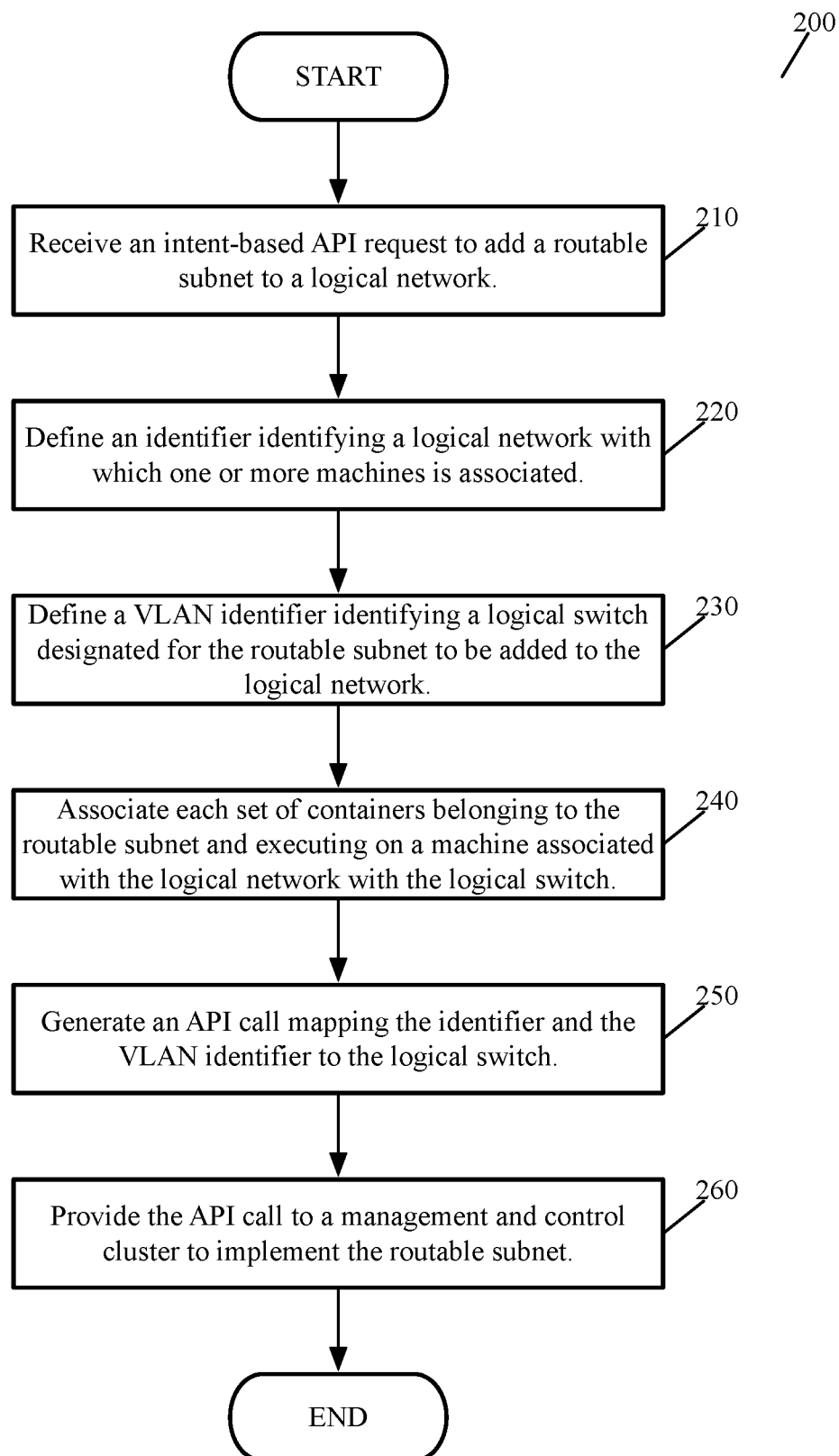
FIG. 2 conceptually illustrates a process of some embodiments for implementing routable segments for container sets (and/or pods) belonging to various subnets and running on various host machines of a logical network.

FIG. 2 conceptually illustrates a process of some embodiments for implementing routable segments for container sets (and/or pods) belonging to various subnets and running on various host machines of a logical network. The process 200 is performed, in some embodiments, by a control system that processes APIs. The process 200 starts when the process receives (at 210) an intent-based API request to add a routable subnet to a logical network. In some embodiments, the intent-based API is received from a user (e.g., network administrator) through a user interface (UI) provided by the control system. As will be further described below by reference to FIG. 3, an API server of the control system receives and parses the API requests. In some embodiments, the control system executes on a Kubernetes master node and is responsible for managing and controlling multiple worker nodes in a Kubernetes cluster. The API, in some embodiments, is in a declarative, hierarchical Kubernetes format, and, in some embodiments, contains multiple different requests.

The process defines (at 220) an identifier identifying a logical network with which one or more machines is associated. The identifier, in some embodiments, is a logical network identifier associated with a particular logical switch of the logical network. In some embodiments, the identifier is a logical switch identifier for a logical switch to which the one or more machines logically connect, while in other embodiments, the identifier is a VNIC identifier associated with a VNIC of a machine that executes containers belonging to one or more subnets. In still other embodiments, the identifier is a logical switch port identifier associated with a particular port of a logical switch to which a particular machine connects.

The process defines (at 230) a VLAN identifier identifying a logical switch (e.g., segment) designated for the routable subnet to be added to the logical network. In the diagram 100, for example, each routable segment 120 and 125 is defined within their respective logical networks 110 and 115 using a respective VLAN identifier 1-N, with each respective VLAN identifier further corresponding to a respective subnet of the logical network 110 or 115. As a result, each subnet has its own designated segment for transporting traffic tagged with the VLAN identifier to and from members of the subnet.

The process associates (at 240) each set of containers belonging to the routable subnet and executing on a machine associated with the logical network with the logical switch (i.e., the logical switch designated for the routable subnet). As will be discussed in more detail below, the VLAN identifiers allow multiple container sets executing on different hosts but belonging to the same subnet to connect to the same routable segment designated for that subnet. As such, multiple host machines of each logical network 110 and 115, for instance, can be logically connected to multiple routable segments 120 and 125. In some embodiments, a host machine may also logically connect to different routable segments of different logical networks.

The process generates (at 250) an API call mapping the identifier for the logical network and the VLAN identifier to the logical switch (e.g., to an identifier for the logical switch). In some embodiments, the structure of the API call maps (1) the VLAN identifier and (2) a logical switch identifier defined for a logical switch to which a machine executing containers belonging to the routable subnet attaches, to (3) a logical switch identifier defined for the logical switch designated for the routable subnet. In other embodiments, the structure of the API call maps (1) the VLAN identifier and (2) a logical switch identifier defined for a logical switch to which a machine executing containers belonging to the routable subnet attaches, to (3) a virtual private cloud (VPC) identifier (or LNI) associated with the logical switch designated for the routable subnet. In still other embodiments, the structure of the API call maps (1) the VLAN identifier and (2) a VNIC identifier associated with a VNIC of a machine executing containers belonging to the routable subnet, to (3) a virtual private cloud (VPC) identifier (or LNI) associated with the logical switch designated for the routable subnet. In still even other embodiments, the structure of the API call maps (1) the VLAN identifier and (2) a logical switch port identifier associated with a particular port of a logical switch to which a machine executing containers belonging to the routable subnet attaches, to (3) a virtual private cloud (VPC) identifier (or LNI) associated with the logical switch designated for the routable subnet.

In some embodiments, the control system includes a network controller plugin (NCP) for receiving parsed APIs from the API server and generating the API calls using one of the structures described above. Also, rather than including an NCP, the control system of some embodiments instead includes an Antrea-NSX-T adapter to receive the parsed APIs from the API server and generate the API calls, as will be discussed further below by reference to FIGS. 3 and 8.

After generating the API call, the process provides (at 260) the API call to a management and control cluster to implement the routable segment. The management and control cluster, in some embodiments, executes separately from the master node that executes the control system. In some embodiments, the management and control cluster includes a manager cluster and a separate control cluster. The API calls, in some embodiments, are provided to the manager cluster, which directs the control cluster to configure network elements to implement the routable subnet, while in other embodiments, the API calls are provided directly to the control cluster for implementation. Following 260, the process 200 ends.

Figure 3:
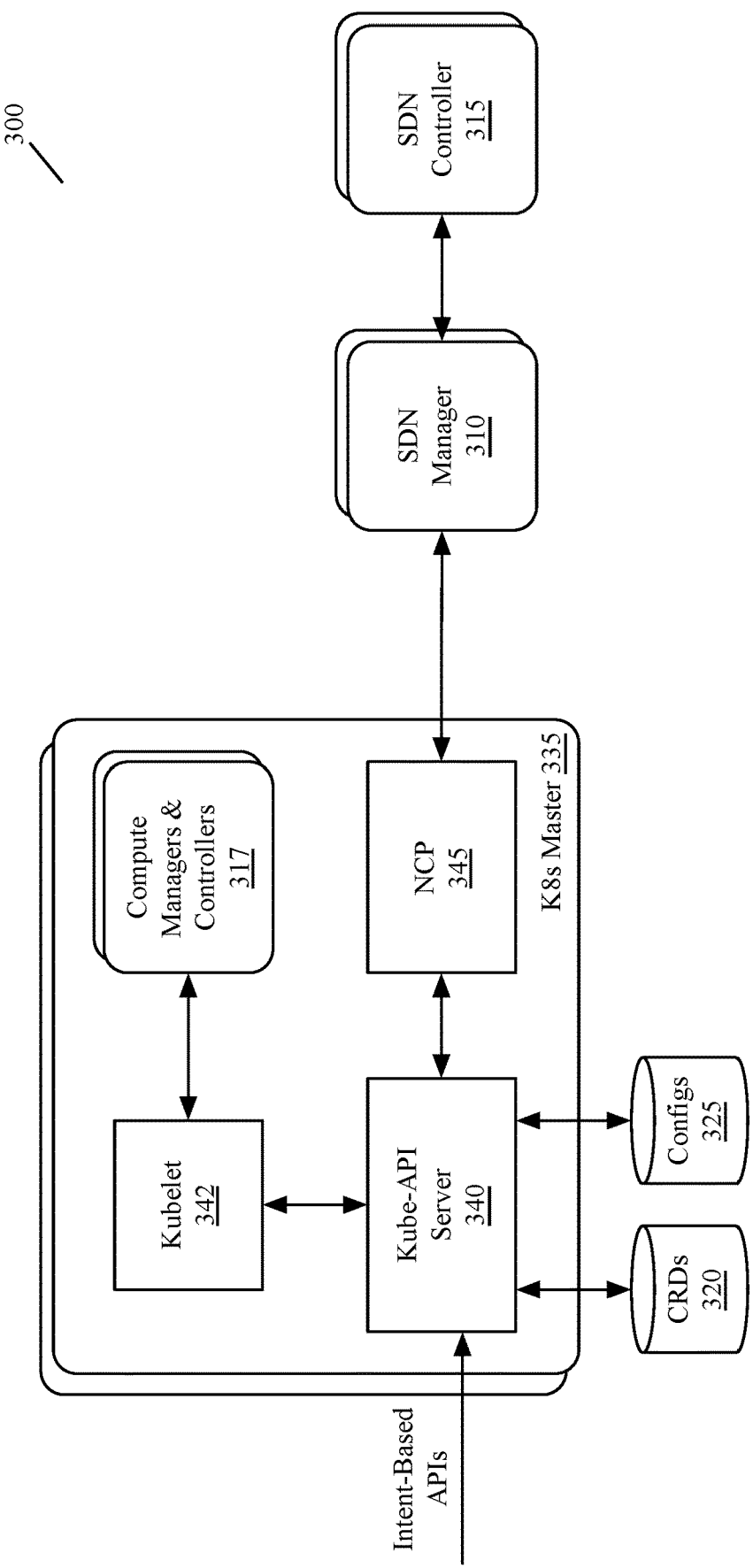
FIG. 3 illustrates an example of a control system of some embodiments of the invention that processes APIs.

FIG. 3 illustrates an example of a control system 300 of some embodiments of the invention that processes APIs that use the Kubernetes-based declarative model to describe the desired state of (1) the machines to deploy, and (2) the connectivity, security and service operations that are to be performed for the deployed machines (e.g., private and public IP addresses connectivity, load balancing, security policies, etc.). To process the APIs, such as the APIs mentioned above that map LNIs and VLAN identifiers to segments associated with subnets corresponding to the VLAN identifiers, the control system 300 uses one or more CRDs (custom resource definitions) to define some of the resources referenced in the APIs. The system 300 performs automated processes to deploy a logical network that connects the deployed machines and segregates these machines from other machines in the datacenter set. The machines are connected to the deployed logical network of a virtual private cloud (VPC) in some embodiments.

As shown, the control system 300 includes two or more master nodes 335 for API processing, a software defined network (SDN) manager cluster 310, and an SDN controller cluster 315. Each of the master nodes 335 for API processing includes an API processing server 340, a Kubelet 442 node agent, compute managers and controllers 317, and a network controller plugin (NCP) 345. The API processing server 340 receives intent-based API calls and parses these calls. In some embodiments, the received API calls are in a declarative, hierarchical Kubernetes format, and may contain multiple different requests.

The API processing server 340 parses each received intent-based API request into one or more individual requests. When the requests relate to the deployment of machines, the API server provides these requests directly to compute managers and controllers 317, or indirectly provide these requests to the compute managers and controllers 317 through the Kubelet 342 and/or the NCP 345 running on the Kubernetes master node 335. The compute managers and controllers 317 then deploy VMs and/or sets of containers on host computers in the availability zone.

The kubelet 342 node agent on a node can register the node with the API server 340 using one of: the hostname; a flag to override the hostname; or specific logic for a cloud provider. The kubelet 342 receives sets of containerspecs, YAML (a data serialization language) or JavaScript Object Notation (JSON) formatted objects that each describe a pod. The kubelet 342 uses sets of containerspecs to create (e.g., using the compute managers and controllers 317) the sets of containers that are provided by various mechanism elements (e.g., from the API server 340) and ensures that the containers described in those sets of containerspecs are running and healthy.

The API calls can also include requests that require network elements to be deployed. In some embodiments, these requests explicitly identify the network elements to deploy, while in other embodiments the requests can also implicitly identify these network elements by requesting the deployment of compute constructs (e.g., compute clusters, containers, etc.) for which network elements have to be defined by default. As further described below, the control system 300 uses the NCP 345 to identify the network elements that need to be deployed, and to direct the deployment of these network elements.

In some embodiments, the API calls refer to extended resources that are not defined per se by the baseline Kubernetes system. For these references, the API processing server 340 uses one or more CRDs 320 to interpret the references in the API calls to the extended resources. The CRDs in some embodiments define extensions to the Kubernetes networking requirements. In some embodiments, the CRDs can include network-attachment-definition (NDs), Virtual Network Interfaces (VIF) CRDs, Virtual Network CRDs, Endpoint Group CRDs, security CRDs, Virtual Service Object (VSO) CRDs, and Load Balancer CRDs. In some embodiments, the CRDs are provided to the API processing server 340 in one stream with the API calls.

NCP 345 is the interface between the API server 340 and the SDN manager cluster 310 that manages the network elements that serve as the forwarding elements (e.g., switches, routers, bridges, etc.) and service elements (e.g., firewalls, load balancers, etc.) in an availability zone. The SDN manager cluster 310 directs the SDN controller cluster 315 to configure the network elements to implement the desired forwarding elements and/or service elements (e.g., logical forwarding elements and logical service elements) of one or more logical networks. As further described below, the SDN controller cluster 315 interacts with local controllers on host computers and edge gateways to configure the network elements in some embodiments.

In some embodiments, NCP 345 registers for event notifications with the API server 340, e.g., sets up a long-pull session with the API server to receive all CRUD (Create, Read, Update and Delete) events for various CRDs that are defined for networking. In some embodiments, the API server 340 is a Kubernetes master VM, and the NCP 345 runs in this VM as a Pod. NCP 345 in some embodiments collects realization data from the SDN resources for the CRDs and provide this realization data as it relates to the CRD status. In some embodiments, the NCP 345 communicates directly with the API server 340 and/or through the Kubelet 342.

In some embodiments, NCP 345 processes the parsed API requests relating to NDs, VIFs, virtual networks, load balancers, endpoint groups, security policies, and VSOs, to direct the SDN manager cluster 310 to implement (1) the NDs that designate network segments for use with secondary interfaces of sets of containers, (2) the VIFs needed to connect VMs and sets of containers to forwarding elements on host computers, (3) virtual networks to implement different segments of a logical network of the VPC, (4) load balancers to distribute the traffic load to endpoint machines, (5) firewalls to implement security and admin policies, and (6) exposed ports to access services provided by a set of machines in the VPC to machines outside and inside of the VPC. In some embodiments, rather than directing the manager cluster 310 to implement the NDs, VIFs, virtual networks, load balancers, endpoint groups, security policies, and VSOs, the NCP 345 in some embodiments communicates directly with the SDN controller cluster 315 to direct the controller cluster 315 to implement the NDs, VIFs, virtual networks, load balancers, endpoint groups, security policies, and VSOs.

The API server 340 provides the CRDs 320 that have been defined for these extended network constructs to the NCP 345 for it to process the APIs that refer to the corresponding network constructs (e.g., network segments). The API server 340 also provides configuration data from the configuration storage 325 to the NCP 345. The configuration data in some embodiments include parameters that adjust the pre-defined template rules that the NCP 345 follows to perform its automated processes. In some embodiments, the configuration data includes a configuration map. The configuration map of some embodiments may be generated from one or more directories, files, or literal values. In some embodiments, the configuration map is generated from files in the configuration storage 325, from data received by the API server from the NCP and/or from data generated by the SDN manager 310. The configuration map in some embodiments includes identifiers of pre-created network segments of the logical network.

The NCP 345 performs these automated processes to execute the received API requests in order to direct the SDN manager cluster 310 to deploy the network elements for the VPC. For a received API, the control system 300 performs one or more automated processes to identify and deploy one or more network elements that are used to implement the logical network for a VPC. The control system performs these automated processes without an administrator performing any action to direct the identification and deployment of the network elements after an API request is received.

The SDN managers 310 and controllers 315 can be any SDN managers and controllers available today. In some embodiments, these managers and controllers are the NSX-T managers and controllers licensed by VMware, Inc. In such embodiments, NCP 345 detects network events by processing the data supplied by its corresponding API server 340, and uses NSX-T APIs to direct the NSX-T manager 310 to deploy and/or modify NSX-T network constructs needed to implement the network state expressed by the API calls. The communication between the NCP and NSX-T manager 310 is asynchronous communication, in which NCP provides the desired state to NSX-T managers, which then relay the desired state to the NSX-T controllers to compute and disseminate the state asynchronously to the host computer, forwarding elements and service nodes in the availability zone (i.e., to the SDDC set controlled by the controllers 315).

After receiving the APIs from the NCPs 345, the SDN managers 310 in some embodiments direct the SDN controllers 315 to configure the network elements to implement the network state expressed by the API calls. In some embodiments, the SDN controllers serve as the central control plane (CCP) of the control system 300. As further described below by reference to FIG. 8, rather than the NCP receiving the parsed API requests and other data from the API server 340, an Antrea-NSX-T adapter running on a master node 335 receives the parsed API requests and other data from the API server 340, such as API requests for adding routable subnets for logical networks, and generates API calls to direct the manager and controller clusters 310 and 315 to implement the routable segments.

A network segment, sometimes called a logical switch, logical network segment, or a transport zone, acts in a manner similar to a subnet (e.g., a layer 2 broadcast zone), such as the routable segments 120 and 125 described above. Individual sets of containers can interface with a network segment and communicate with other sets of containers or devices configured to interface with the network segment. However, one of ordinary skill in the art will understand that a network segment (or logical switch) does not operate as a physical switch connecting devices that are both directly connected to the same switch, but for example as a VPN tunnel or VLAN, allowing sets of containers or devices that are not directly connected to communicate as though they are all connected to a common switch. As mentioned above, and will be further described below, some embodiments associate a logical switch (i.e., network segment) with each subnet, as well as a VLAN identifier, to enable multiple pods belonging to different subnets to execute on the same worker node, and to enable multiple pods belonging to the same subnet to execute on different worker nodes while maintaining a logical connection to the same logical switch.

Figure 4:
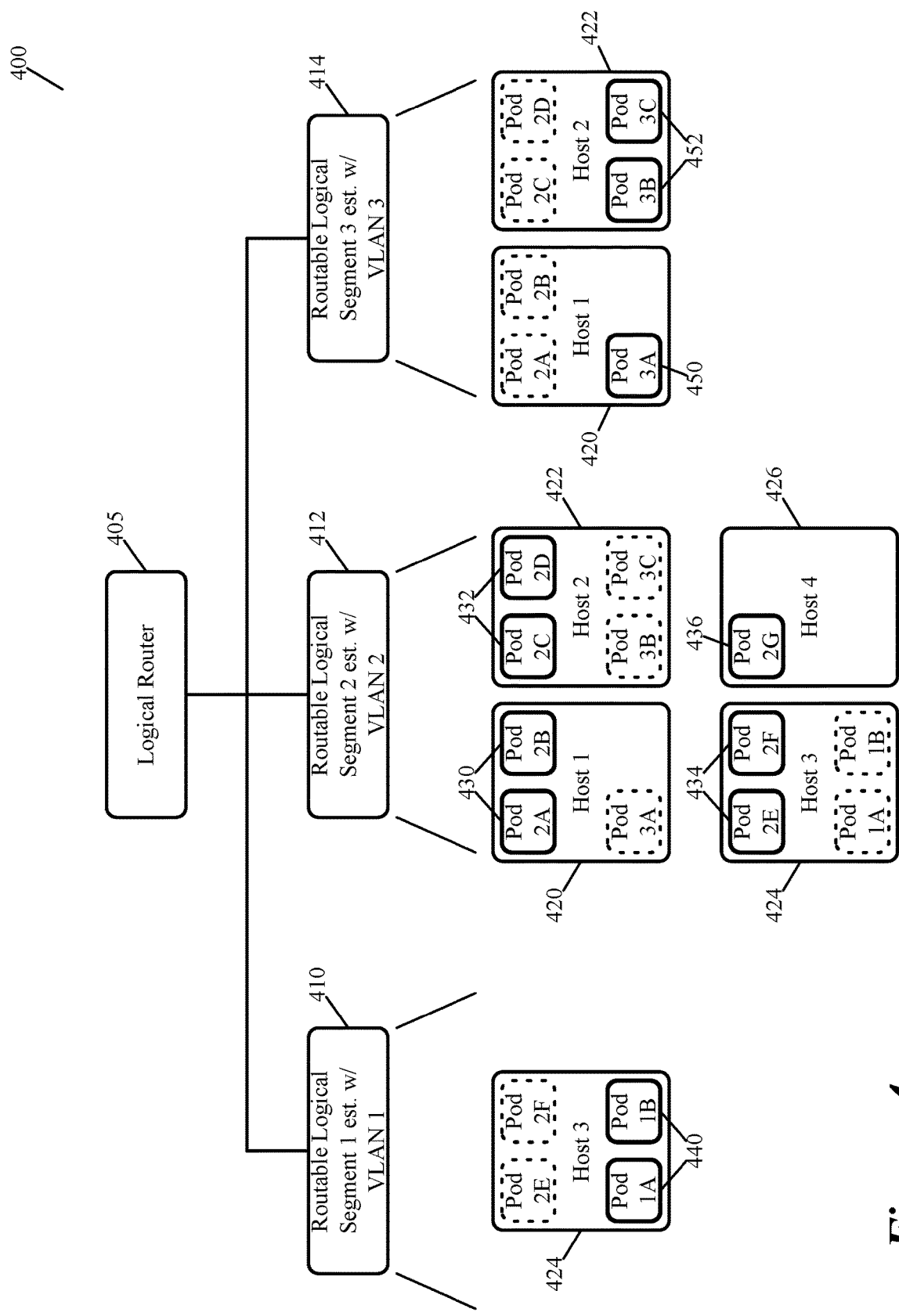
FIG. 4 conceptually illustrates logical connections between host machines executing pods belonging to different subnets of a logical network and routable segments corresponding to the different subnets.

FIG. 4 conceptually illustrates logical connections between host machines executing pods belonging to different subnets of a logical network and routable segments corresponding to the different subnets. As shown, the logical network 400 includes a set of routable segments 410, 412, and 414 that are logically connected to a logical router 405. The routable segments 410-414 are logical switches, in some embodiments, established with VLAN identifiers corresponding to the subnets for which the routable segments route traffic. The logical router 405 is a tier-1 gateway logical router in some embodiments, and a tier-0 gateway logical router in other embodiments, and a virtual routing and forwarding (VRF) gateway logical router that is linked to a tier-0 gateway logical router and that includes multiple simultaneous instances of a routing table (e.g., one for each VLAN/subnet) in order to keep traffic for the different subnets segregated and to prevent conflicts caused by different subnets allocating the same or overlapping IP addresses to elements belonging to the different subnets in still other embodiments.

Each routable segment 410-414 is logically connected to one or more host machines based on whether a host machine executes a pod belonging to a subnet corresponding to the routable segment. For instance, host machine 424 is logically connected to routable segment 410 based on pods 440 belonging to the subnet corresponding to the VLAN identifier 1, and is also logically connected to routable segment 412 based on pods 434 belonging to the subnet corresponding to VLAN identifier 2. Host 420 which executes pods 430, host 422 which executes pods 432, and host 426 which executes pod 436 are also logically connected to the routable segment 412 based on the pods 430, 432, and 436 belonging to the subnet corresponding to VLAN identifier 2. Similarly, hosts 420 and 422, which execute pods 450 and 452, respectively, also logically connect to the routable segment 414 based on the pods 450 and 452 belonging to the subnet corresponding to the VLAN identifier 3.

In some embodiments, each host machine includes a VNIC (not shown) through which pods of each subnet logically connect to their respective routable logical segment. To keep the VLAN signals segregated while enabling pods and/or containers belonging to multiple different VLANs (subnets) to execute on the same host machine and to extend these VLANs across the network, the VNICs of some embodiments are configured to operate as VLAN trunks. A VLAN trunk, in some embodiments, is a trunked port that is configured to pass traffic for multiple VLANs over a single link while keeping the traffic for each VLAN segregated. For instance, a VNIC (not shown) of host machine 420 that is configured to operate as a VLAN trunk would pass traffic between the pods 430 and the routable segment 412, as well as between the pod 450 and the routable segment 414. As mentioned above, traffic associated with a particular subnet is tagged with the VLAN identifier corresponding to that particular subnet in order for the traffic to be routed by the routable segment designated for the particular subnet.

Figure 5:
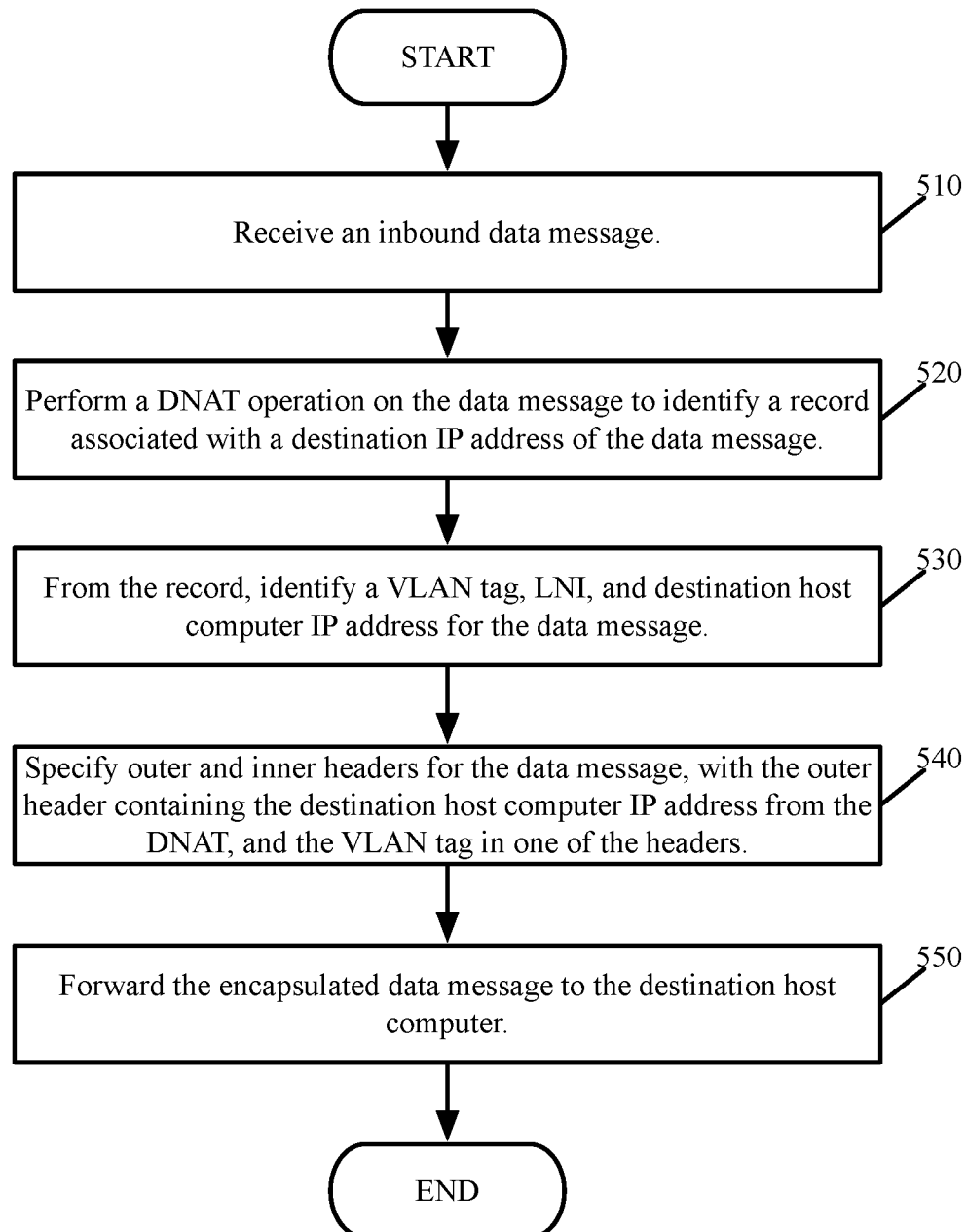
FIG. 5 conceptually illustrates a process of some embodiments for forwarding southbound data messages for a logical network.
Figure 6:
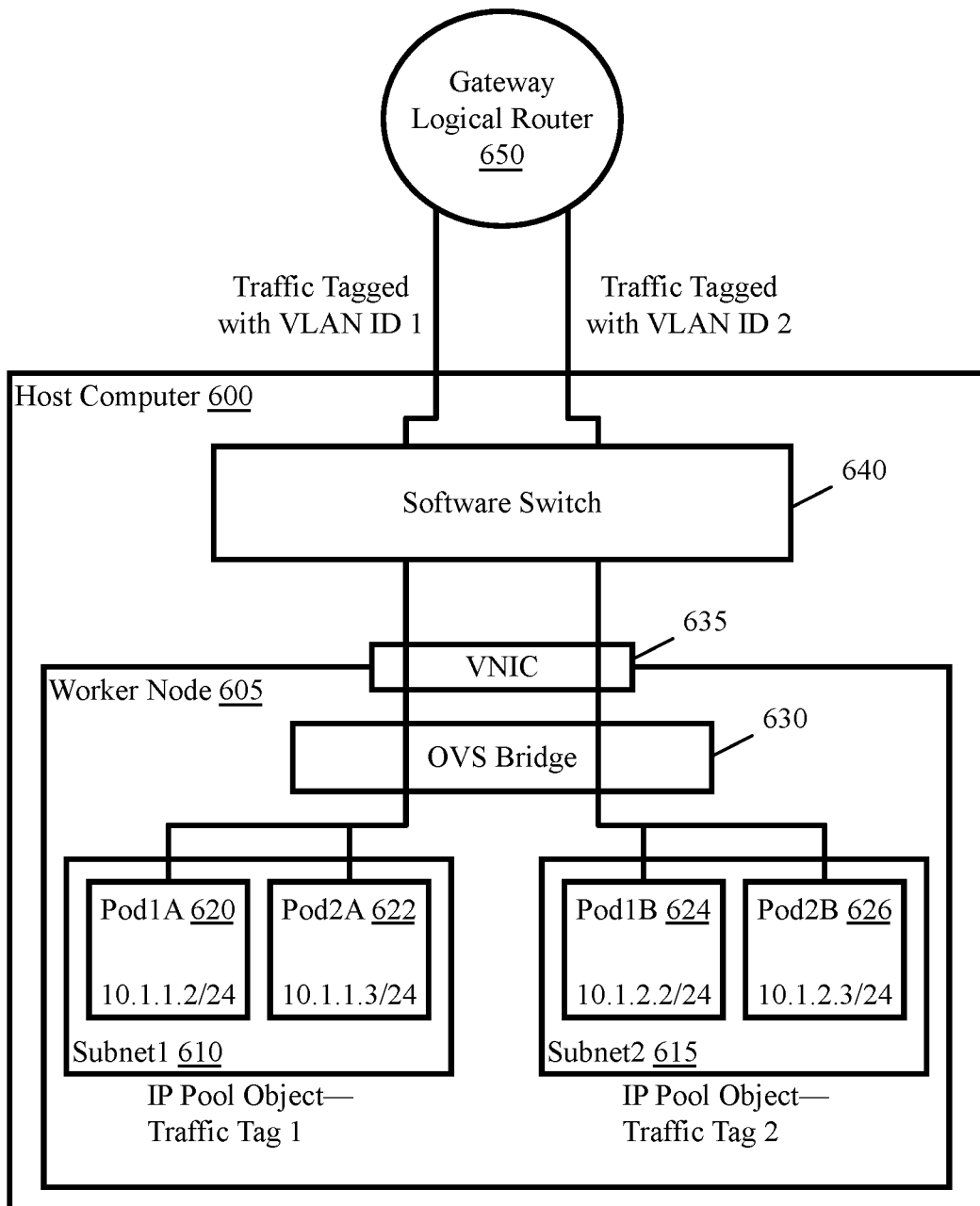
FIG. 6 illustrates a host computer of some embodiments that is connected to a gateway router and that executes a worker node on which pods belonging to two different subnets execute.

FIG. 5 conceptually illustrates a process of some embodiments for processing and forwarding inbound data messages for a logical network. The process 500 is performed by a gateway logical router (e.g., a gateway logical router that connects elements of the logical network to external networks), in some embodiments. The process 500 will be described below with reference to FIG. 4 as well as FIG. 6, which illustrates a host computer of some embodiments that is connected to a gateway logical router and that executes a worker node on which pods belonging to two different subnets of a logical network execute.

The process 500 starts when the gateway logical router receives (at 510) an inbound data message. For example, the gateway logical router 405 of the logical network 400 receives (e.g., from an external network (not shown)) inbound data messages destined to host machines 420-426, and the gateway logical router 650 receives inbound data messages destined to the host computer 600. In some embodiments, because the gateway logical router receives traffic for multiple different subnets, the gateway logical router is a VRF gateway logical router that is linked to a tier-0 gateway logical router and that includes multiple simultaneous instances of a routing table (e.g., one for each VLAN/subnet) in order to keep traffic for the different subnets segregated and to prevent conflicts caused by different subnets allocating the same or overlapping IP addresses to elements belonging to the different subnets.

The process performs (at 520) a DNAT (destination network address translation) operation on the data message to identify a record associated with a destination IP address of the data message. In some embodiments, when the gateway logical router is a VRF gateway logical router, the DNAT operation includes identifying a VRF instance used to tag the data message, and using the identified VRF instance to identify a corresponding record. In some embodiments, the record is provided to the gateway logical router from SDN controllers at the direction of SDN managers based on mappings provided by API calls. Also, in some embodiments, the gateway router 650 includes three components—a service router (SR) component, a distributed router (DR) component, and a switch component—and the DNAT operation is performed by the SR component.

From the record, the process identifies (at 530) a VLAN tag, LNI, and destination host computer IP address for the data message. The VLAN tag, in some embodiments, corresponds to a subnet with which a destination of the data message is associated, and the combination of the VLAN tag, LNI, and destination host computer IP address map to a segment designated for the subnet. For instance, in the logical network 400, an LNI for the logical network 400, the VLAN identifier 1, and an IP address assigned to the host 424 would map to the routable logical segment 410.

After identifying the VLAN tag, LNI, and destination host computer IP address, the process specifies (at 540) outer and inner headers for the data message, with the outer header containing the destination host computer IP address from the DNAT, and the VLAN tag in one of the headers. In some embodiments, the destination host computer IP address is a logical IP address for the destination host computer used for routing data messages to and from the destination host computer within the logical network. The VLAN tag, in some embodiments, enables interfaces of the logical network to determine how to route data messages from one place in the logical network to another (e.g., based on which segment a VLAN tag corresponds to).

The process then forwards (at 550) the encapsulated data message to the destination host computer. Following 550, the process 500 ends. While the process 500 is described above as including a DNAT operation, other embodiments of the invention do not rely on DNAT. For instance, in some other embodiments of the invention, subnets are routable out of gateway logical routers. In still other embodiments, a load balancer is deployed to expose the pods and/or containers in the subnet and to perform the DNAT operation. Also, in some embodiments of the invention, the VLAN tag is added by a virtual switch operating on virtualization software (e.g., a hypervisor) that executes on the destination host before the tagged data message is sent to the VNIC of the destination node. In some such embodiments, the VLAN tag is used by the subnet within the destination node for identifying which pod or container of which subnet the data message is destined.

In some embodiments, the DR component of the gateway logical router 650 (or the gateway logical router 405) performs the forwarding step, and forwards the encapsulated data message to the switch component. The switch component of the gateway logical router 650, in some embodiments, encapsulates the data message with a Geneve encapsulation header, and tunnels the encapsulated data message to the software switch 640 of the host computer 600. In some embodiments, the Geneve header used to encapsulate the data message allows the encapsulated data message to be sent to the software switch 640 via a tunnel of an underlay network between the switches.

The software switch 640, in some embodiments, passes the data messages to the VNIC 635 of the worker node 605 executing on the host computer 600. The worker node 605, in some embodiments, is a machine such as a virtual machine (VM). In some embodiments, the worker node 605 is one of many worker nodes executing on the host computer 600. In some such embodiments, the many worker nodes may belong to the same logical network or to different logical networks, and may each execute containers and/or pods belonging to various subnets of the logical networks.

In some embodiments, the VNIC 635 passes the data messages to specific ports or interfaces (not shown) of a software switch of the worker node 605, such as the OVS bridge 630, based on the data messages' destination(s). In some embodiments, the OVS bridge 630 includes a virtual ethernet interface (not shown) for each container or pod executing on the worker node. As such, upon receiving a data message from the VNIC 635, the OVS bridge 630 passes the data message to the interface (not shown) corresponding to the pod 620-626 to which the data message is destined.

Because the pods 620-626 belong to different subnets, and are assigned IP addresses from different IP pools, the OVS bridge 630, in some embodiments, uses both the destination IP address of the data message and the VLAN identifier used to tag the data message to determine which interface to pass the data message to for delivery to its destination. That is, since pods of different subnets may be allocated overlapping IP addresses within their respective subnets, the OVS bridge 630 of some embodiments relies on the VLAN tag in addition to the destination IP address to ensure that even if two pods of two different subnets have a same IP address, the data message will be delivered to the correct pod of the correct subnet.

For instance, data messages with a destination IP address 10.1.1.2/24 and tagged with the VLAN identifier 1 are passed to pod 620 belonging to the subnet 610, data messages with a destination IP address 10.1.1.3/24 and tagged with the VLAN identifier 1 are passed to pod 622 also belonging to the subnet 610, data messages with a destination IP address 10.1.2.2/24 and tagged with the VLAN identifier 2 are passed to pod 624 belonging to the subnet 615, and data messages with a destination IP address 10.1.2.3/24 and tagged with the VLAN identifier 2 are passed to pod 626 belonging to the subnet 615. In some embodiments, the OVS bridge 630 also includes an interface designated for traffic between pods of the same subnet, and an interface designated for traffic between pods of different subnets, as will be described below with reference to FIGS. 10-11.

When one of the pods 620-626 sends a data message, in some embodiments, the OVS bridge 630 passes the data message to the VNIC 635, which tags the data message with the VLAN identifier corresponding to the subnet to which the source pod of the data message belongs. In some embodiments, the VNIC 635 uses an IP table of the worker node 605 to determine which subnet the source pod belongs to based on the source pod's assigned IP address. IP tables and how they are populated will be described further below with reference to FIG. 8. Once the VNIC 635 determines which subnet the source pod of the data message belongs to, the VNIC 635 encapsulates the data message with the appropriate VLAN tag corresponding to that subnet and passes the data message to the software switch 640, according to some embodiments, for forwarding to its destination.

Figure 7:
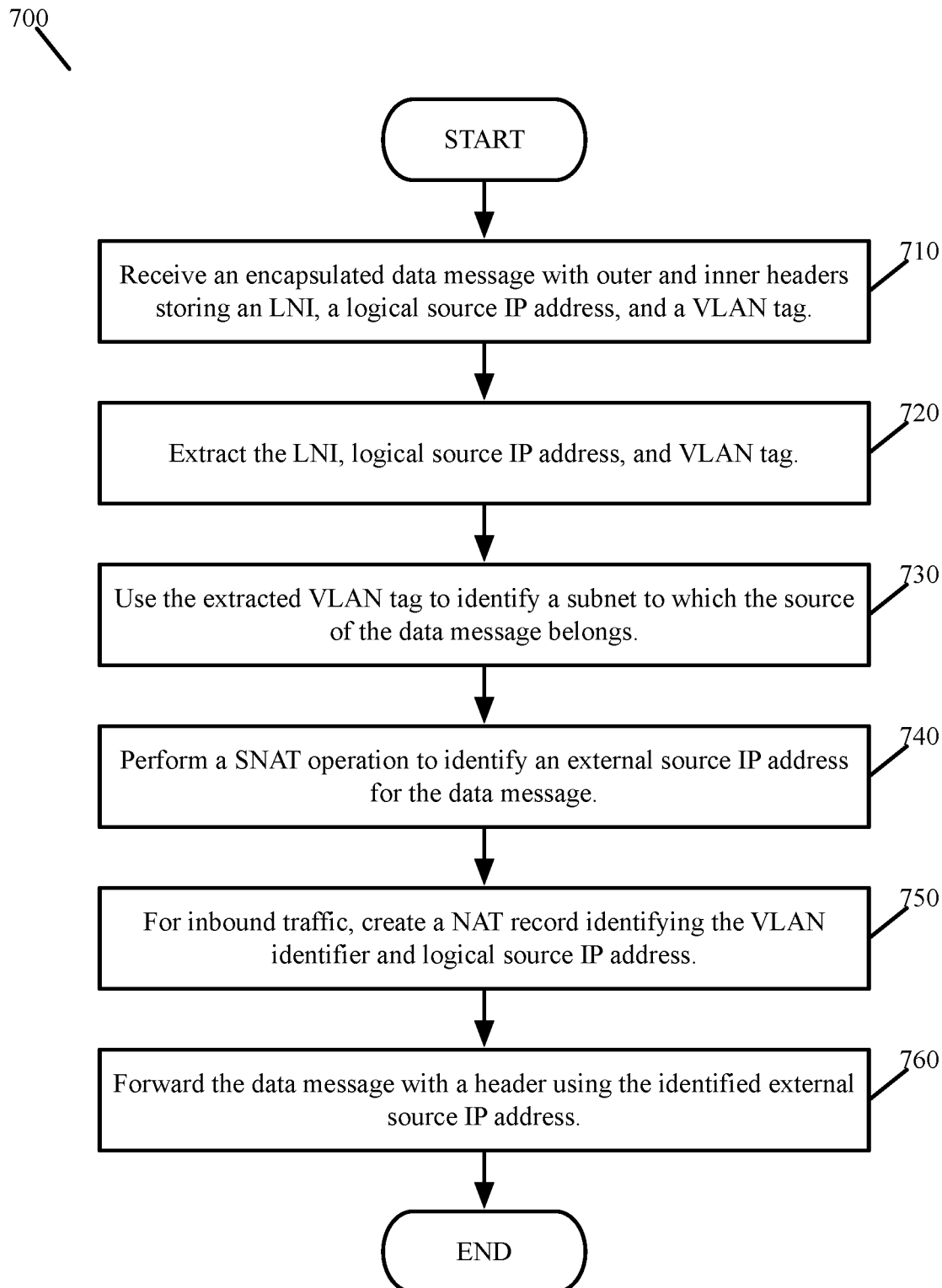
FIG. 7 conceptually illustrates a process of some embodiments for forwarding northbound data messages for a logical network.

FIG. 7 conceptually illustrates a process of some embodiments for forwarding outbound data messages for a logical network. Like the process 500, the process 700 is also performed by a gateway logical router, according to some embodiments. The process 700 starts when the gateway logical router receives (at 710) an encapsulated data message with outer and inner headers storing an LNI, a logical source IP address, and a VLAN tag. For instance, the gateway logical router 650 receives outbound data messages from the host computer 600.

The process extracts (at 720) the LNI, logical source IP address, and VLAN tag, and uses (at 730) the extracted VLAN tag to identify a subnet to which the source of the data message belongs. The gateway logical router 650, for example, receives outbound data messages from pods 620-622 executing on the worker node 605 and belonging to the subnet 610, as well as outbound data message from pods 624-626 executing on the worker node 605 and belonging to the subnet 615. Upon receiving an outbound data message, the gateway logical router 605 extracts the LNI, logical source IP address, and VLAN tag, and uses the VLAN tag to determine whether the source pod belongs to the subnet 610 or the subnet 615.

The process then performs (at 740) a SNAT (source network address translation) operation to identify an external source IP address for the data message. In some embodiments, the gateway logical router performs the SNAT operation to identify the external source IP address for the data message by identifying a SNAT IP address pool allocated for the subnet corresponding to the VLAN tag extracted from the data message, and selecting an IP address from the pool to use for the data message. In some embodiments, the SR component of the gateway logical router performs the SNAT operation.

For inbound traffic, the process creates (at 750) a NAT record identifying the VLAN identifier and logical source IP address. That is, in order to ensure that inbound data messages destined to the source of the outbound data message are able to be properly routed to the appropriate destination, the gateway logical router of some embodiments creates a record associating the VLAN identifier and logical source IP address with the assigned external source IP address selected from the SNAT IP address pool. As such, upon receiving an inbound data message with a destination IP address that is the same as the external source IP address used for the outbound data message, the gateway logical router can perform a DNAT operation to identify the record and convert the external source IP address to the logical source IP address to use as the destination IP address, and tag the inbound data message with the VLAN identifier to forward the inbound data message to its destination. The process then forwards (at 760) the data message with a header using the identified external source IP address. Following 760, the process 700 ends.

Similar to the DNAT operation performed by the process 500, the SNAT operation described above is not always relied on by the process 700, according to other embodiments of the invention. Also, the gateway logical router, in some embodiments of the invention, does not receive data messages having the VLAN tag. In some such embodiments, a virtual switch operating on virtualization software (e.g., a hypervisor) of the source host removes the VLAN tag and forwards the untagged packet to the appropriate logical segment based on the removed VLAN tag.

Figure 8:
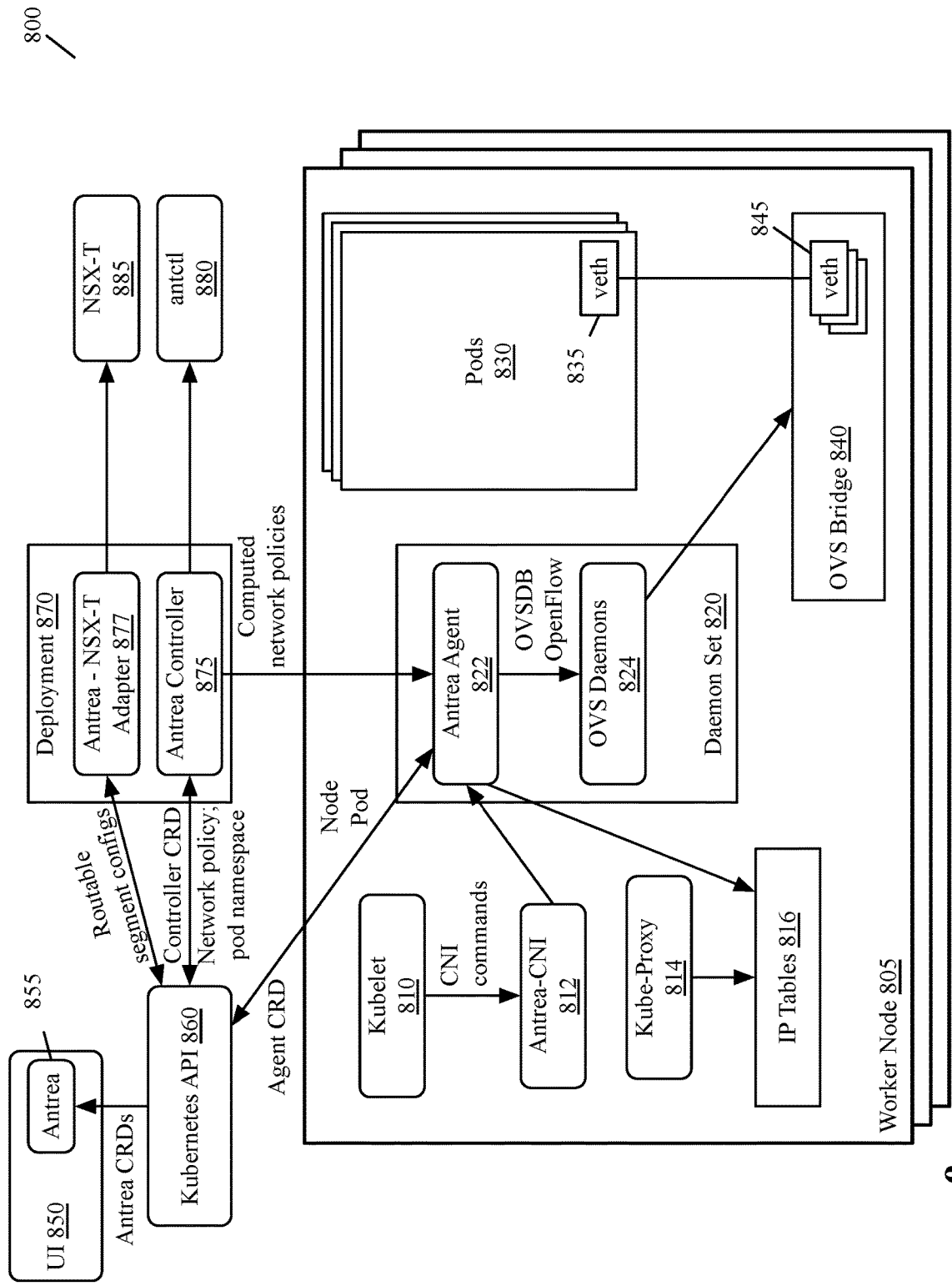
FIG. 8 illustrates an Antrea networking solution of some embodiments.

As mentioned above, some embodiments assign Internet Protocol (IP) addresses to containers and/or pods belonging to a particular subnet from an IP address pool allocated to the particular subnet. FIG. 8 illustrates an Antrea networking solution of some embodiments. As a Kubernetes networking solution, Antrea implements the Container Network Interface (CNI), while Kubernetes NetworkPolicy operates at Layer 3/4 (L3/L4) to provide network connectivity and security services for a Kubernetes cluster (i.e., collection of nodes for running containerized applications), leveraging the benefit of programmable networks from Open vSwitch (OVS) to Kubernetes. OVS is a widely adopted high-performance programmable virtual switch, originating from VMware, Inc., that is designed to enable effective network automation through programmatic extensions. The Antrea network solution described herein leverages OVS in its architecture to efficiently implement pod networking and security features.

In some embodiments, because of the programmable OVS, forwarding functions are opened to programmatic extension and control. Based on this, a new flexible Antrea IPAM plugin overrides and extends the existing flow tables, which are managed by a new centralized custom resource definition (CRD) instead of a local store IP management state from the original host-local IPAM plugin. This centralized controller helps to provide the ability of multiple networks on pod and IPAM per-namespace, according to some embodiments. In some embodiments, in an L3 forwarding table, all traffic destined to a remote pod is forwarded through the appropriate tunnel, and for the return flow from a remote pod to local node, a distinction must be drawn between the remote gateway and the local gateway, according to some embodiments.

As shown, the Antrea networking solution 800 includes Kubernetes nodes 805, a user interface (UI) 850 with an Antrea plugin 855, a Kubernetes API server 860, a deployment 870 that runs the Antrea controller 875 and an Antrea-NSX-T adapter 877, NSX-T manager and controller cluster 885, and Antrea command-line tool 880 (i.e., antctl 880). In some embodiments, the UI 850, Kubernetes API server 860, deployment 870, and Antrea command-line tool 880 execute together as part of the control plane on a single master node. Also, in some embodiments, the NSX-T manager and controller cluster 885 includes separate manager and controller clusters, such as the SDN manager cluster 310 and SDN controller cluster 315 described above.

To provide a more flexible IPAM (host-local IP address management) that is based on namespace isolation, the deployment 870 runs the Antrea controller 875, which is used along with corresponding CRDs (custom resource definitions) to manage all of the IP addresses for pods executing on nodes in the network. As a result, each pod subnet is associated with a respective namespace such that the IP of assigned to a pod is related to its business, in some embodiments. Additionally, pods located under the same namespace are in the same local area network (LAN), in some embodiments, while pods under different namespaces are isolated on different networks. In some embodiments, a static IP address assigned to a pod can be configured by the annotation filed for the corresponding configuration file. Users (e.g., administrators) could also monitor the IP usage from the Antrea command-line tool 880 or the UI 850 in order to expand the corresponding IP resource pool in a timely manner when IP resources are exhausted, according to some embodiments.

The deployment 870 also runs the Antrea-NSX-T adapter 877, as shown. The Antrea-NSX-T adapter 877, in some embodiments, replaces the NCP 345 on the master node 335, as mentioned above. In some embodiments, the Antrea-NSX-T adapter 877 receives parsed API requests regarding routable segment configurations (i.e., for adding routable subnets to a logical network) from the API server 860, and generates API calls to direct the NSX-T manager and controller cluster 885 to implement the routable subnets, according to some embodiments.

The UI 850 is used to manage Kubernetes clusters by translating human-readable commands into API calls that can be understood by the Kubernetes API server 860. In some embodiments, the UI 850 is a VMware Octant UI, and presents its output in a graphical user interface (GUI) for viewing by a user (e.g., administrator). The UI 850 runs locally on the user's workstation, according to some embodiments, and as a result, does not use up resources of the node or nodes that it manages. The UI 850 includes Antrea plugin 855 for receiving Antrea CRDs from the Kubernetes API server 860.

The Antrea controller 875 additionally monitors network policy, pod, and namespace resources with the Kubernetes API 860. The Antrea controller 875, in some embodiments, uses information associated with these resources to compute policy rules, which can be translated to Open vSwitch (OVS) flows efficiently and disseminated to a targeted Antrea agent (e.g., Antrea agent 822) that runs on a node along with one or more affected pods. The Kubernetes API server 860 enables different components of the Kubernetes cluster (i.e., a master node and set of one or more worker nodes) to communicate with each other and with components external to the cluster, according to some embodiments. Additionally, in some embodiments, the API server 860 enables users to query and alter the states of API objects, such as pods, namespaces, configuration maps, and events.

Each of the worker nodes 805 includes a kubelet 810, Antrea-CNI (container network interface) 812, kube proxy 814, IP tables 816, daemonset 820, one or more pods 830, and an OVS bridge 840. The kubelet 810, in some embodiments, is responsible for registering the node 805 with the API server 860. Additionally, the kubelet 810 ensures that containers defined in pod specifications received from the API server 860 are both running and healthy. In some embodiments, instead of receiving the pod specifications from the API server 860, the kubelet 810 receives the pod specifications from an HTTP endpoint (not shown) or an HTTP server (not shown).

The daemonset 820 includes two containers to run the Antrea agent 822 and the OVS daemons 824, respectively, on every node, as well as an init-container (not shown) that installs the Antrea-CNI 812 on the node. The Antrea-CNI 812, in some embodiments, requests IP addresses for pods instantiated on the node 805, and interacts with the Antrea agent 822 to update the IP table 816 with the assigned IP addresses. The Kube proxy 814 runs on the node 805 to maintain network rules on the node to allow network communications to the pods 830 from sessions within the cluster, as well as sessions outside of the cluster. In some embodiments, the Kube proxy 814 forwards data traffic for the pods itself using the IP addresses in the IP table 816. In some embodiments, OVS realizes the dataplane on each of the worker nodes 805 at the same time, and in response, the Antrea controller 875 implements the control plane of the software-defined network (SDN) for which the Antrea networking solution 800 is implemented.

The Antrea agent 822 helps to bridge the Antrea controller 875 and OVS between the master node (not shown) and each other node 805 by creating the OVS bridge 840 and a veth pair for each pod 830, with one end 835 of the veth pair being in the pod's network namespace, and the other end 845 connected to the OVS bridge 840. As shown, the Antrea agent 822 interacts with the OVS bridge 840 via the OVS daemons 824. In some embodiments, on the OVS bridge 840, the Antrea agent 822 also creates an internal port antrea-gw0 (not shown) by default as the gateway of the node's subnet, and a tunnel port antrea-tun0 (not shown) for creating overlay tunnels to other nodes 805.

The containers, in some such embodiments, use (address resolution protocol) ARP messages (i.e., for IPv4) or (neighbor discovery) ND messages (i.e., for IPv6) to advertise their assigned IP addresses to other containers (or sets of containers (e.g., pods)) belonging to the particular subnet by tagging these messages with the LNI associated with the particular subnet. In some embodiments, tagging these messages with the LNI associated with the particular subnet ensures these messages are only read by members of the particular subnet.

Figure 9:
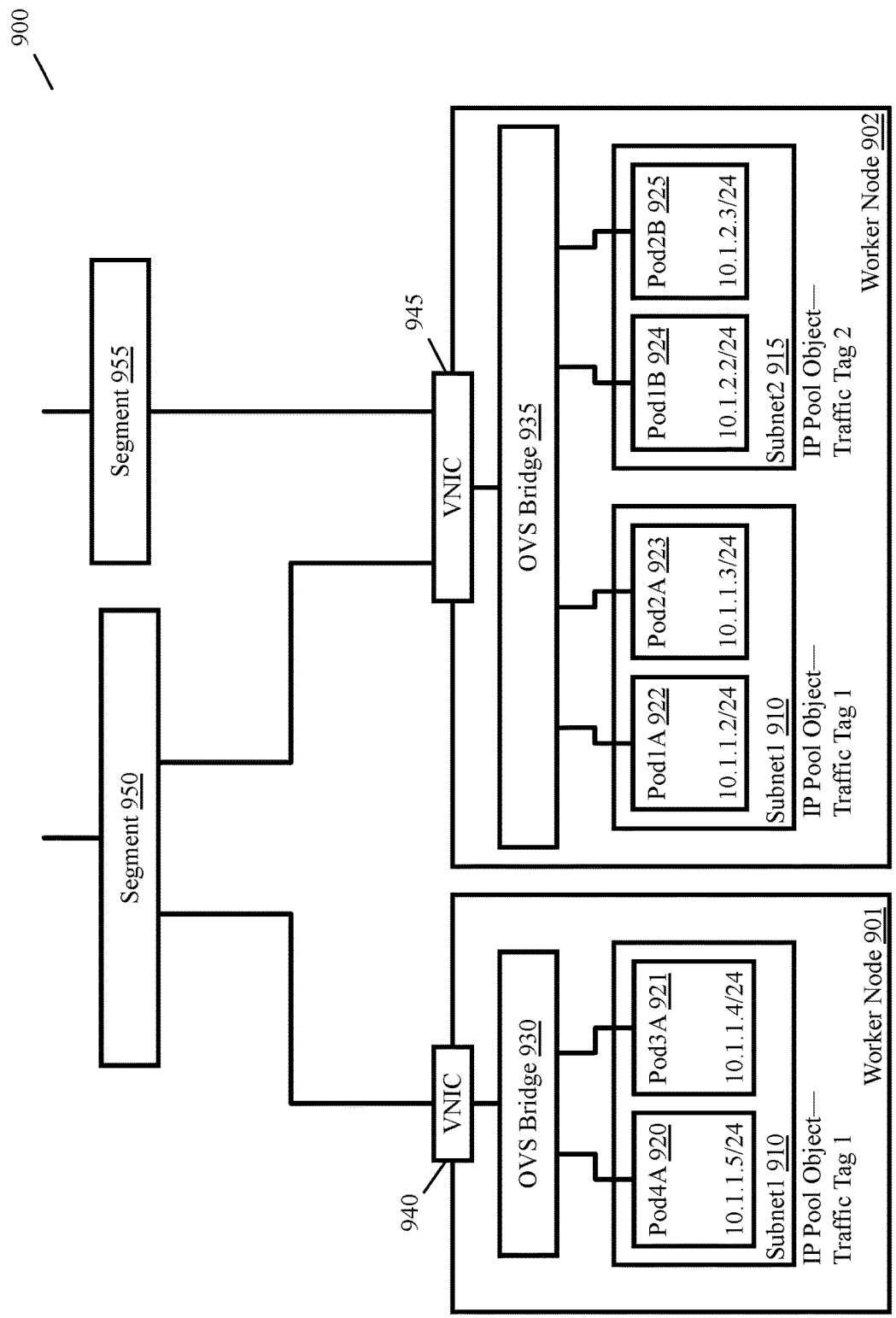
FIG. 9 conceptually illustrates worker nodes of a logical network that each execute pods belonging to two subnets.

In some embodiments, pods belonging to the same subnet may execute on different worker nodes and still receive data messages from the same segment. FIG. 9 conceptually illustrates worker nodes of a logical network that each execute pods belonging to two subnets. The worker node 901 includes a VNIC 940, OVS bridge 930, and pods 920 and 921 both belonging to subnet 910 and having logical connections to the segment 950 designated for subnet 910. The worker node 902 includes a VNIC 945, OVS bridge 935, pods 922 and 923 belonging to subnet 910 and having logical connections to segment 950, and pods 924 and 925 belonging to subnet 915 and having logical connections to segment 955.

The pods 920-923 of the subnet 910 are all logically connected to the segment 950 designated for the subnet 910 despite being spread across the two worker nodes 901 and 902 based on an API added to the controller (not shown) of the network that maps the VLAN identifier 1, and, in some embodiments, each of the VNICs 940-945, to the segment 950. This mapping allows the segment 950 to receive and transport data messages for the subnet 910 across the different host machines 901 and 902. Additionally, the segment 950 allows the pods 920-923 to advertise their IP addresses (e.g., using ARP or ND messages) to other pods belonging to the subnet 910 without exposing these messages to machines outside of the subnet 910 because the segment 950 only transports traffic tagged with the VLAN identifier 1 for the subnet 910, in some embodiments. Similarly, the segment 955 only transports traffic tagged with the VLAN identifier 2 for the subnet 915 such that only members of the subnet 915 would be able to read IP address advertisement messages from the pods 924 and 924, according to some embodiments.

Figure 10:
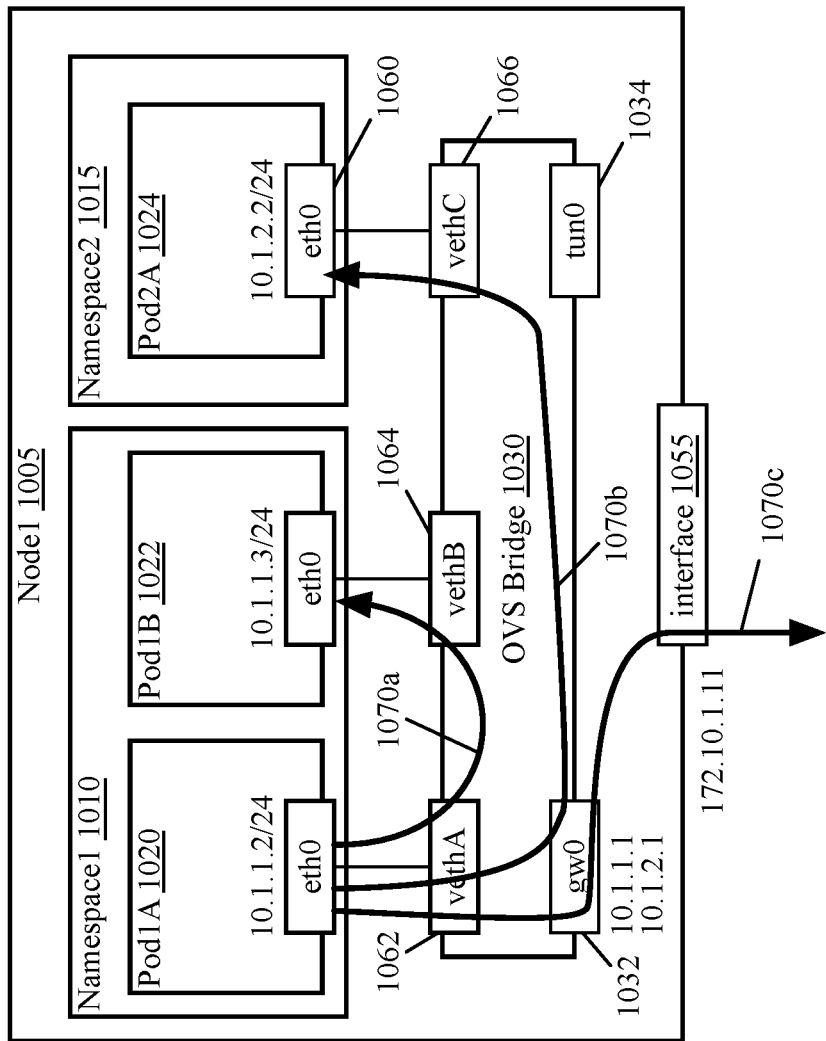
FIG. 10 illustrates an intra-node data transfer system of some embodiments for communications between pods belonging to the same namespace, between pods belonging to different namespaces, and between a pod and elements external to the node.

In some embodiments, when NAT is enabled, the segments attached to the worker nodes are also configured to transport all east-west Geneve encapsulated data message flows. FIG. 10 illustrates an intra-node data transfer system of some embodiments for communications between pods belonging to the same namespace, for pods belonging to different namespaces (i.e., subnets), and for pods sending data messages to elements external to the worker node (e.g., to other worker nodes). As shown, the node 1005 includes a first namespace 1010 associated with a first subnet 10.1.1.0/24 that includes pods 1020 and 1022, a second namespace 1015 associated with a second subnet 10.1.2.0/24 that includes the pod 1024, and an OVS bridge 1030. Each of the pods 1020-1024 includes an Ethernet interface 1060 for connecting to a respective virtual ethernet interface of the OVS bridge 1030. As illustrated, the Ethernet interface 1060 of the pod 1020 connects to the virtual Ethernet interface 1062 of the OVS bridge 1040, the Ethernet interface 1060 of the pod 1022 connects to the virtual Ethernet interface 1064 of the OVS bridge 1040, and the Ethernet interface 1060 of the pod 1024 connects to the virtual Ethernet interface 1066 of the OVS bridge 1040.

In addition to the virtual Ethernet interfaces 1062-1066, the OVS bridge 1030 also includes the gateway interface 1032 and tunnel interface 1034. The number of IP addresses of each gateway interface 1032 on the OVS bridge 1030 is the same as the number of subnets such that the gateway interface 1032 does not act as a single node gateway, but rather as a traffic interface that can serve multiple subnets. Accordingly, the gateway interface 1032 has two IP addresses, 10.1.1.1/24 and 10.1.2.1/24, and is the common outlet for traffic between the two subnets 10.1.1.0/24 and 10.1.2.0/24. Each subnet has its own IP and routing tables (not shown) which are responsible for the traffic outside the cluster, according to some embodiments.

In this example, the pod 1020 is illustrated as communicating with the pod 1022 by the line 1070a. Because the pods 1020 and 1022 belong to the same namespace 1010, the communications 1070a only traverse the Ethernet interfaces 1060 of the pods 1020 and 1022, and the virtual Ethernet interfaces 1062 and 1064, respectively, of the OVS bridge 1030.

While the pods 1020 and 1022 are able to communicate through their respective Ethernet interfaces 1060 and the respective virtual Ethernet interfaces of the OVS bridge 1030 based on belonging to the same namespace 1010, the pods 1020 and 1024 belong to different namespaces 1010 and 1015, respectively. As such, communications 1070b from the pod 1020 to the pod 1024 are sent from the Ethernet interface 1060 of the pod 1020 to the virtual Ethernet interface 1062 of the OVS bridge, and are then routed by the gateway interface 1032 of the OVS bridge to the virtual Ethernet interface 1066 of the OVS bridge, which connects to the Ethernet interface 1060 of the pod 1024.

The node 1005 additionally includes an interface 1055 with a corresponding IP address 172.10.1.11. The interface 1055, in some embodiments, connects the node 1005 to other network elements external to the node 1005 via intervening network fabric. For instance, the path 1070c is illustrative of a path used to send communications to elements that are external to the node 1005, such as other worker nodes, forwarding elements, etc. After leaving the Ethernet interface 1060 of the pod 1020, the path 1070c traverses the virtual Ethernet interface 1062 associated with the pod 1020, and is then forwarded by the gateway interface 1022 through the node's interface 1055.

In some embodiments, the node 1055 executes on a host computer (not shown), and the node's interface 1055 connects the node to a network interface card (NIC) of the host computer through a software switch of the host computer. In some such embodiments, the data traffic is then forwarded by the MC onto a network for delivery to its destination. In some embodiments, an Antrea agent (e.g., Antrea agent 822 in the solution 800 described above) on the node 1005 creates an IP table rule to perform SNAT (source network address translation) on packets sent from any of the pods 1020-1024.

The node 1005, in some embodiments, executes with one or more other nodes on a host computer, and the intervening network fabric is a software switch (e.g., the software switch 640) on the host computer for connecting the nodes to each other and to network elements external to the host computer. Also, in some embodiments, the intervening network fabric includes wired or wireless connections, various network forwarding elements (e.g., switches, routers, etc.), etc., such as when pods running on nodes that execute on different host computers exchange communications. Examples of inter-node communications and communications with external elements will be described in more detail below.

Figure 11:
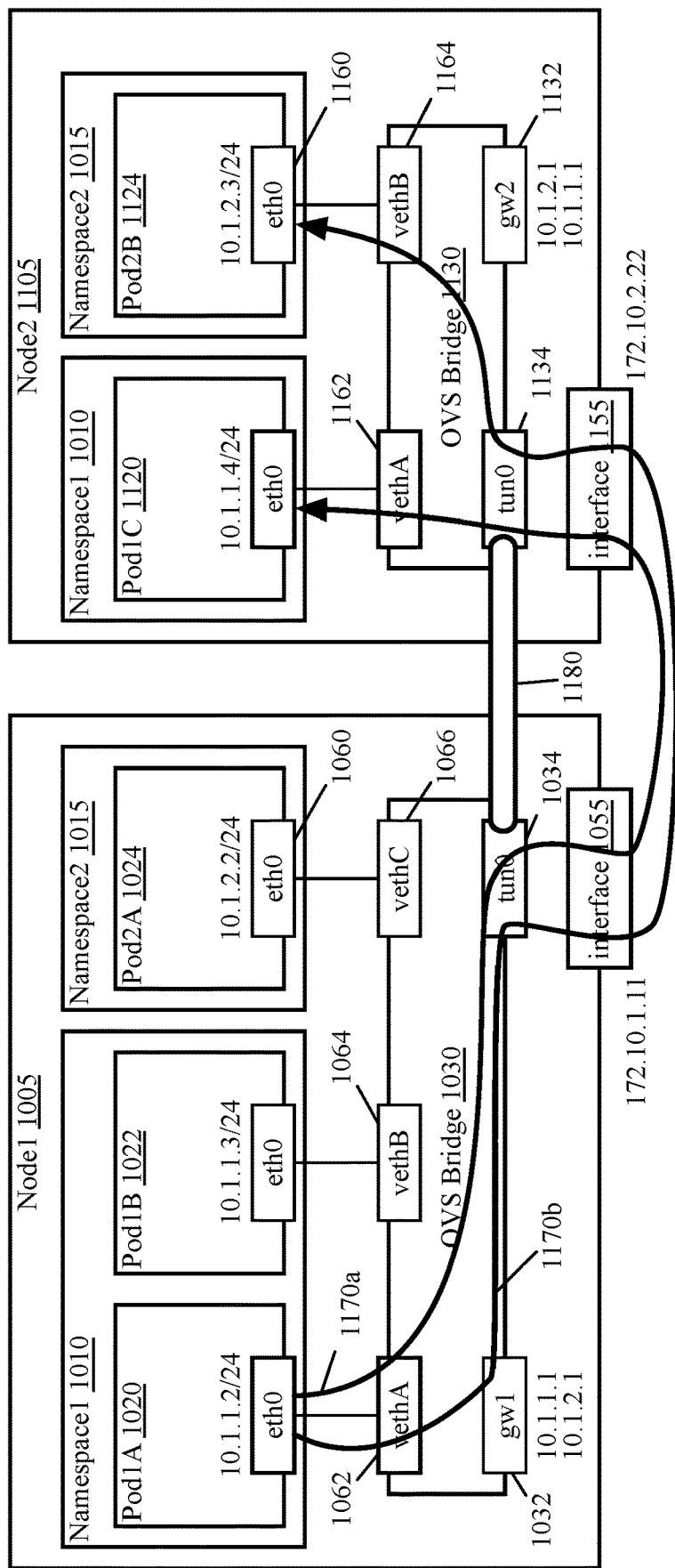
FIG. 11 illustrates an inter-node data transfer system of some embodiments for sending data between container sets executing on different nodes and belonging to the same subnet and belonging to different subnets.

For example, FIG. 11 illustrates an inter-node data transfer system of some embodiments for sending data between container sets executing on different nodes and belonging to the same subnet, as well as between container sets executing on different nodes and belonging to different subnets. In addition to the node 1005, a second node 1105 is instantiated, and, like the node 1005, the node 1105 includes the namespace 1010 and the namespace 1015, corresponding to the subnets 10.1.1.0/24 and 10.1.2.0/24, respectively. Additionally, the node 1105 includes an OVS bridge 1130, and an interface 1155.

The first namespace 1010 on the node 1105 includes a pod 1120, and the second namespace 1015 on the node 1105 includes a pod 1124. Accordingly, the namespace 1010 includes each of the pods 1020, 1022, and 1120, while the namespace 1015 includes each of the pods 1024 and 1124. Like the pods 1020-1024, each of the pods 1120 and 1124 includes an Ethernet interface 1160, and has a corresponding virtual Ethernet interface 1162 and 1164 on the OVS bridge 1130.

The OVS bridge 1130 further includes a tunnel interface 1134 and a gateway interface 1132. The gateway interface 1132 is associated with the two subnets 10.1.1.0/24 and 10.1.2.0/24 that are associated with the namespaces 1010 and 1015. Like the gateway interface 1032, the gateway interface 1132 has two IP addresses, 10.1.1.1/24 and 10.1.2.1/24. While the examples described herein show the gateway interfaces as being associated with two subnets, other embodiments can include additional subnets not shown.

The tunnel interfaces 1034 and 1134 of the OVS bridges 1030 and 1130 are used to create an overlay tunnel 1180 between the nodes 1005 and 1105. The tunnel 1180 is used to send data traffic between pods that execute on different nodes and belong to the same subnet, in some embodiments. In some such embodiments, the data is encapsulated at the source tunnel interface, decapsulated at the destination tunnel interface, and injected through the destination tunnel port to the OVS bridge where it is finally forwarded to its destination. Also, in some embodiments, the encapsulated data messages include VLAN tags using the VLAN identifiers defined for the subnets. The tunnel 1180, in some embodiments, is a VXLAN (virtual extensible LAN) tunnel, while in other embodiments, the tunnel 1180 is a Geneve tunnel, or any other OVS supported tunneling protocol.

In some embodiments, the OVS bridge stores several forwarding records, each of which includes a set of match attributes and an action attribute. The OVS bridge compares each flow with its forwarding records in order to identify a highest priority record that has a match-attribute set that matches a set of attributes of the data message flow (e.g., flow header values). When the OVS bridge matches a flow to one of its forwarding records, it then performs a forwarding operation based on the action attribute of its matching record. For the L2 lookup, the match attributes are typically L2 header values, whereas for an L3 lookup, the match attributes are typically L3 and L4 header values.

For two pods that execute on different nodes, but belong to the same subnet and namespace, data traffic is forwarded using the tunnel interfaces 1034 and 1134 as mentioned above. For instance, the path 1170a illustrates the path traversed by data traffic sent from the pod 1020 on the node 1005 to the pod 1120 on the node 1105. The pods 1020 and 1130 both belong to the same subnet and namespace 1010. As such, the data traffic is sent from the Ethernet interface 1060 of the pod 1020 to the virtual Ethernet interface 1062. The virtual Ethernet interface 1062 then forwards the packet to the tunnel interface 1034 for encapsulation. In some embodiments, the OVS bridge determines a data message is being exchanged between pods of the same subnet based on the VLAN identifier used to tag the data message.

After the data has been encapsulated, the tunnel interface 1034 forwards the data to the tunnel interface 1134 on the destination node 1105 such that the data traffic flows through the interface 1055 of the node 1005 and traverses intervening network fabric until it reaches interface 1155 of the destination node 1105. The data is then sent to the tunnel interface 1134 for decapsulation and forwarding to the virtual Ethernet interface 1162 corresponding to the destination pod 1120. In some embodiments, the nodes 1005 and 1105 execute on different host computers. In some such embodiments, the intervening network fabric includes wired or wireless connections and various network forwarding elements (e.g., switches, routers, etc.). Alternatively, in some embodiments, the nodes 1005 and 1105 execute on the same host computer and the intervening network fabric includes a software switch executing on the host computer, and the software switch includes ports for connecting the nodes to each other and to a NIC of the host computer for exchanging communications with elements external to the host computer.

In addition to the path 1170a, data traffic is also being sent along the path 1170b between pod 1020 on node 1005 to pod 1124 on node 1105. Because the pods 1020 and 1124 belong to different subnets, data traffic between these pods cannot traverse the same path 1170a as the data traffic between pods belonging to the same subnet. Instead, data traffic between pods belonging to different subnets is routed by the gateway interface 1032 or 1132.

Rather than being transferred from the virtual Ethernet interface 1062 associated with the source pod 1020 directly to the tunnel interface 1034, data traffic from pod 1020 to pod 1124 is directed to from the virtual Ethernet interface 1062 to the gateway interface 1032, which routes the data to the tunnel interface 1034 of the OVS bridge 1030 for encapsulation and forwarding toward the destination. The data traffic then follows a similar path as 1170a, and is forwarded by the interface 1055 of node 1005 to the interface 1155 of the node 1155. The interface 1155 sends the data to the tunnel interface 1134 for decapsulation, and the decapsulated data is subsequently delivered to the pod 1124 via its associated virtual Ethernet interface 1164.

As mentioned above, data traffic between nodes traverses an intervening network fabric. In some embodiments, such as when the nodes are executing on the same computing device, the intervening network fabric includes a software switch executing on the computing device to connect different nodes on the computing device to each other and to a NIC of the computing device (i.e., for exchanging data between the nodes and elements external to the computing device). Inter-node and intra-node data transfer systems are also described in commonly owned U.S. patent application Ser. No. 17/684,160, entitled "PER-NAMESPACE IP ADDRESS MANAGEMENT METHOD FOR CONTAINER NETWORKS," filed on Mar. 2, 2022, and U.S. patent application Ser. No. 17/684,169, also entitled "PER-NAMESPACE IP ADDRESS MANAGEMENT METHOD FOR CONTAINER NETWORKS," and filed on Mar. 2, 2022. U.S. patent application Ser. Nos. 17/684,160 and 17/684,169 are incorporated herein by reference in their entireties.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
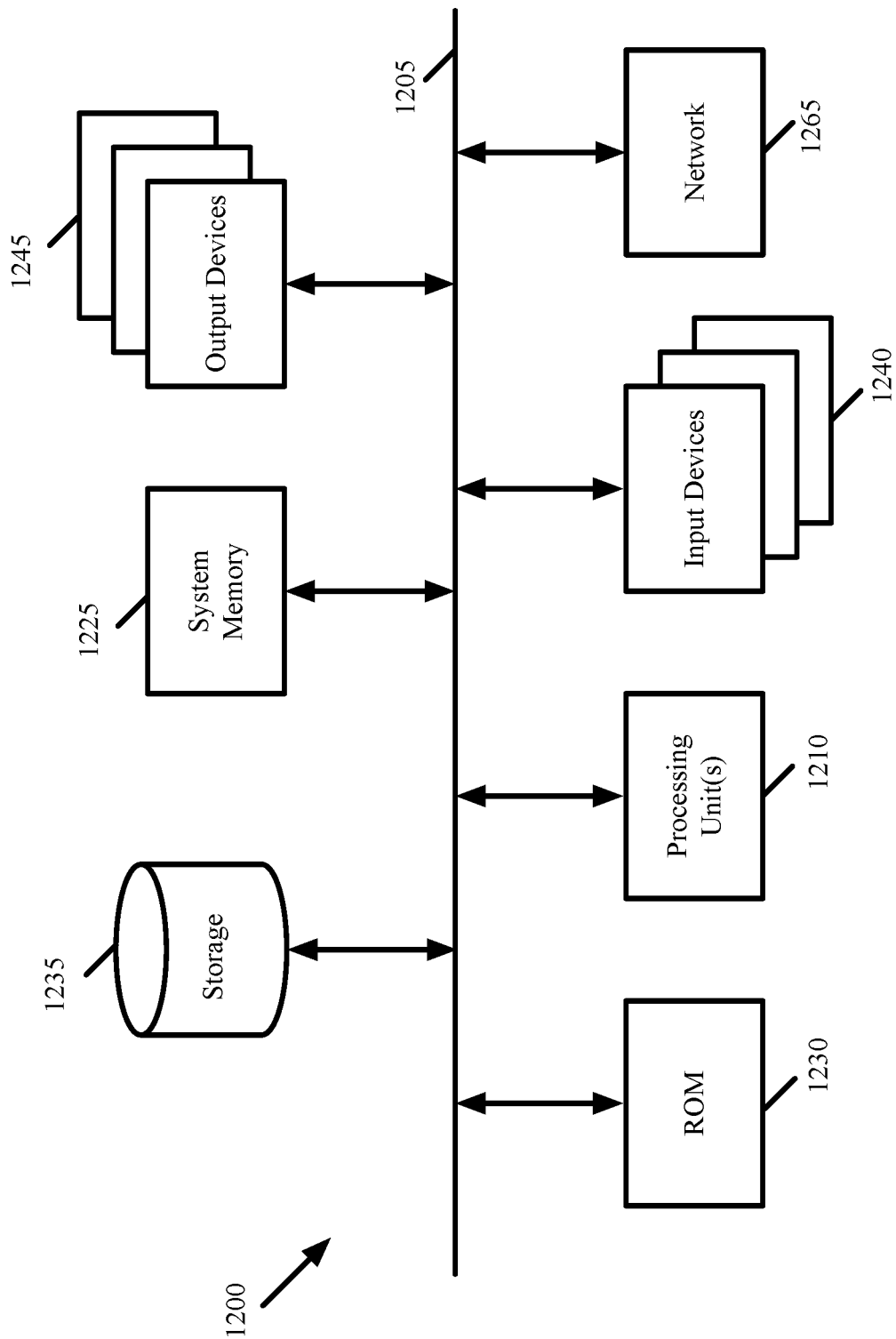
FIG. 12 conceptually illustrates a computer system with which some embodiments of the invention are implemented.

FIG. 12 conceptually illustrates a computer system 1200 with which some embodiments of the invention are implemented. The computer system 1200 can be used to implement any of the above-described hosts, controllers, gateway and edge forwarding elements. As such, it can be used to execute any of the above-described processes. This computer system 1200 includes various types of non-transitory machine-readable media and interfaces for various other types of machine-readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments. The read-only-memory (ROM) 1230 stores static data and instructions that are needed by the processing unit(s) 1210 and other modules of the computer system. The permanent storage device 1235, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device 1235. Like the permanent storage device 1235, the system memory 1225 is a read-and-write memory device. However, unlike storage device 1235, the system memory 1225 is a volatile read-and-write memory, such as random-access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices 1240 enable the user to communicate information and select commands to the computer system 1200. The input devices 1240 include alphanumeric keyboards and pointing devices (also called "cursor control devices"). The output devices 1245 display images generated by the computer system 1200. The output devices 1245 include printers and display devices, such as cathode ray tubes (CRT) or liquid crystal displays (LCD). Some embodiments include devices such as touchscreens that function as both input and output devices 1240 and 1245.

Finally, as shown in FIG. 12, bus 1205 also couples computer system 1200 to a network 1265 through a network adapter (not shown). In this manner, the computer 1200 can be a part of a network of computers (such as a local area network ("LAN"), a wide area network ("WAN"), or an Intranet), or a network of networks (such as the Internet). Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, although several specific network topologies have been described, some embodiments of the invention are implemented in other network topologies as mechanisms to map one or more subnets (e.g., one or more Antrea subnets) to one or more VLAN tags to one or more logical segments. Thus, one of ordinary skill in the art would understand that the invention is not to be limited by the foregoing illustrative details, but rather is to be defined by the appended claims.

The invention claimed is:

1. A method of adding routable subnets to a logical network that connects a plurality of machines and is implemented by a software defined network (SDN), the method comprising:

receiving an intent-based API comprising a request to add a routable subnet to the logical network;

defining (i) a VLAN (virtual local area network) tag associated with the routable subnet, (ii) a first identifier associated with a first logical switch to which at least a first machine in the plurality of machines that executes a set of containers belonging to the routable subnet attaches, and (iii) a second identifier associated with a second logical switch designated for the routable subnet;

generating an API call that maps the VLAN tag and the first identifier to the second identifier; and providing the API call to a management and control cluster of the SDN to direct the management and control cluster to implement the routable subnet;

wherein the first machine is configured to execute the set of containers, and the routable subnet enables a plurality of containers belonging to the routable subnet to be deployed across the plurality of machines connected by the logical network.

2. The method of claim 1, wherein the method is performed by a control system, wherein receiving the intent-based API comprises receiving the intent-based API through a user interface provided by the control system.

3. The method of claim 1, wherein the management and control cluster interacts with local controllers operating on network elements in order to configure the network elements to implement the routable segment according to the API call.

4. The method of claim 1, wherein the first and second identifiers comprise first and second logical switch identifiers.

5. The method of claim 1, wherein the first identifier comprises a logical switch identifier and the second identifier comprises a virtual private cloud (VPC) identifier.

6. The method of claim 1, wherein the first identifier comprises a VNIC (virtual network interface card) identifier and the second identifier comprises a virtual private cloud (VPC) identifier.

7. The method of claim 1, wherein the first identifier comprises a logical switch port identifier associated with the first logical switch and the second identifier comprises a virtual private cloud (VPC) identifier.

8. The method of claim 1, wherein the intent-based API is a first intent-based API, the routable subnet is a first routable subnet of the logical network, the VLAN tag is a first VLAN tag, the set of containers is a first set of containers, and the API call is a first API call, the method further comprising:
receiving a second intent-based API comprising a request to add a second routable subnet to the logical network;
defining (i) a second VLAN tag associated with the second routable subnet, (ii) a third identifier associated with a third logical switch to which at least a second machine in the plurality of machines that executes a second set of containers belonging to the second routable subnet attaches, and (iii) a fourth identifier associated with a fourth logical switch designated for the second routable subnet;
generating a second API call that maps the second VLAN tag and the third identifier to the fourth identifier; and
providing the second API call to the management and control cluster of the SDN to direct the management and control cluster to implement the second routable segment.

9. The method of claim 8, wherein a third set of containers belonging to the second routable subnet execute on the first machine separately from the first set of containers, the method further comprising:
generating a third API call that maps the second VLAN tag and the first identifier to the third identifier; and
providing the third API call to the management and control cluster of the SDN to direct the management and control cluster to update an implementation of the second routable segment.

10. The method of claim 9, wherein the first set of containers are attached to the second logical switch designated for the first routable subnet and the second and third sets of containers are attached to the fourth logical switch designated for the second routable subnet.

11. The method of claim 10, wherein the second logical switch transports traffic tagged with the first VLAN tag and the fourth logical switch transports traffic tagged with the second VLAN tag.

12. A non-transitory machine readable medium storing a program for execution by a set of processing units, the program for adding routable subnets to a logical network that connects a plurality of machines and is implemented by a software defined network (SDN), the program comprising sets of instructions for:
receiving an intent-based API comprising a request to add a routable subnet to the logical network;
defining (i) a VLAN (virtual local area network) tag associated with the routable subnet, (ii) a first identifier associated with a first logical switch to which at least a first machine in the plurality of machines that executes a set of containers belonging to the routable subnet attaches, and (iii) a second identifier associated with a second logical switch designated for the routable subnet;
generating an API call that maps the VLAN tag and the first identifier to the second identifier; and
providing the API call to a management and control cluster of the SDN to direct the management and control cluster to implement the routable subnet;
wherein the first machine is configured to execute the set of containers, and the routable subnet enables a plurality of containers belonging to the routable subnet to be deployed across the plurality of machines connected by the logical network.

13. The non-transitory machine readable medium of claim 12, wherein the management and control cluster interacts with local controllers operating on network elements in order to configure the network elements to implement the routable segment according to the API call.

14. The non-transitory machine readable medium of claim 12, wherein the first and second identifiers comprise first and second logical switch identifiers.

15. The non-transitory machine readable medium of claim 12, wherein the first identifier comprises a logical switch identifier and the second identifier comprises a virtual private cloud (VPC) identifier.

16. The non-transitory machine readable medium of claim 12, wherein the first identifier comprises a VNIC (virtual network interface card) identifier and the second identifier comprises a virtual private cloud (VPC) identifier.

17. The non-transitory machine readable medium of claim 12, wherein the first identifier comprises a logical switch port identifier associated with the first logical switch and the second identifier comprises a virtual private cloud (VPC) identifier.

18. The non-transitory machine readable medium of claim 12, wherein the intent-based API is a first intent-based API, the routable subnet is a first routable subnet of the logical network, the VLAN tag is a first VLAN tag, the set of containers is a first set of containers, and the API call is a first API call, the program further comprising sets of instructions for:
receiving a second intent-based API comprising a request to add a second routable subnet to the logical network;
defining (i) a second VLAN tag associated with the second routable subnet, (ii) a third identifier associated with a third logical switch to which at least a second machine in the plurality of machines that executes a second set of containers belonging to the second routable subnet attaches, and (iii) a fourth identifier associated with a fourth logical switch designated for the second routable subnet;
generating a second API call that maps the second VLAN tag and the third identifier to the fourth identifier; and providing the second API call to the management and control cluster of the SDN to direct the management and control cluster to implement the second routable segment.

19. The non-transitory machine readable medium of claim 18, wherein a third set of containers belonging to the second routable subnet execute on the first machine separately from the first set of containers, the program further comprising sets of instructions for:
generating a third API call that maps the second VLAN tag and the first identifier to the third identifier; and
providing the third API call to the management and control cluster of the SDN to direct the management and control cluster to update an implementation of the second routable segment.

20. The non-transitory machine readable medium of claim 19, wherein:
the first set of containers are attached to the second logical switch designated for the first routable subnet and the second and third sets of containers are attached to the fourth logical switch designated for the second routable subnet; and
the second logical switch transports traffic tagged with the first VLAN tag and the fourth logical switch transports traffic tagged with the second VLAN tag.

* * * * *